US012598283B2

(12) United States Patent
Lim et al.

(10) Patent No.: US 12,598,283 B2
(45) Date of Patent: Apr. 7, 2026

(54) METHOD AND DISPLAY APPARATUS FOR CORRECTING DISTORTION CAUSED BY LENTICULAR LENS

(71) Applicant: Samsung Electronics Co., Ltd., Suwon-si (KR)

(72) Inventors: Kyungmin Lim, Suwon-si (KR); Jonghoon Lee, Suwon-si (KR); Daeyeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/812,391

(22) Filed: Aug. 22, 2024

(65) Prior Publication Data

US 2025/0008073 A1 Jan. 2, 2025

Related U.S. Application Data

(63) Continuation of application No. PCT/KR2024/009017, filed on Jun. 27, 2024.

(30) Foreign Application Priority Data

Jun. 29, 2023 (KR) ........................ 10-2023-0084483
Nov. 9, 2023 (KR) ........................ 10-2023-0154738

(51) Int. Cl.
*H04N 13/305* (2018.01)
*G09G 3/00* (2006.01)
*H04N 13/398* (2018.01)

(52) U.S. Cl.
CPC ........... *H04N 13/305* (2018.05); *G09G 3/003* (2013.01); *H04N 13/398* (2018.05)

(58) Field of Classification Search
None
See application file for complete search history.

(56) References Cited

U.S. PATENT DOCUMENTS 10,021,375 B2 7/2018 Kim et al.
10,805,601 B2 10/2020 Han et al.
(Continued)

FOREIGN PATENT DOCUMENTS

KR 10-0972850 B1 7/2010
KR 10-2017-0115751 A 10/2017
(Continued)

OTHER PUBLICATIONS

International Search Report dated Sep. 20, 2024, issued in International Application No. PCT/KR2024/009017.
(Continued)

*Primary Examiner* — Edemio Navas, Jr.
(74) *Attorney, Agent, or Firm* — Jefferson IP Law, LLP

(57) ABSTRACT

A method performed by a display device including a lenticular lens is provided. The method includes obtaining, by the display device, a target image, identifying, by the display device, a predefined slanted angle of the lenticular lens, identifying, by the display device, in the target image, at least one area including at least one edge having a slanted angle of which similarity to the slanted angle of the lenticular lens is within a preset range, selecting, by the display device, a plurality of sub-pixels of a same row as a first sub-pixel included in the identified at least one area, and allocating, by the display device, a first combination value to an output value of each of the plurality of sub-pixels, the first combination value being obtained by combining values of the plurality of sub-pixels.

20 Claims, 23 Drawing Sheets

(56) References Cited

U.S. PATENT DOCUMENTS

| | | | |
|---|---|---|---|
| 10,997,455 | B2 | 5/2021 | Kim et al. |
| 11,057,611 | B2 | 7/2021 | Kim et al. |
| 11,425,360 | B2 | 8/2022 | Park et al. |
| 11,693,254 | B2 | 7/2023 | Park et al. |
| 2003/0112864 | A1 | 6/2003 | Karezewicz et al. |
| 2004/0076343 | A1* | 4/2004 | Zhang ..................... G06T 3/403 |
| | | | 382/300 |
| 2016/0044305 | A1* | 2/2016 | Kim ..................... H04N 13/351 |
| | | | 348/54 |
| 2017/0134720 | A1* | 5/2017 | Park ..................... H04N 13/398 |

FOREIGN PATENT DOCUMENTS

| | | |
|---|---|---|
| KR | 10-1975246 B1 | 5/2019 |
| KR | 10-2019-0124439 A | 11/2019 |
| KR | 10-2120172 B1 | 6/2020 |
| KR | 10-2021-0045078 A | 4/2021 |
| WO | 2008/123660 A1 | 10/2008 |

OTHER PUBLICATIONS

Lin et al., Color breakup suppression based on global dimming for field sequential color displays using edge information in images, vol. 27, No. 3, Feb. 4, 2019.

* cited by examiner

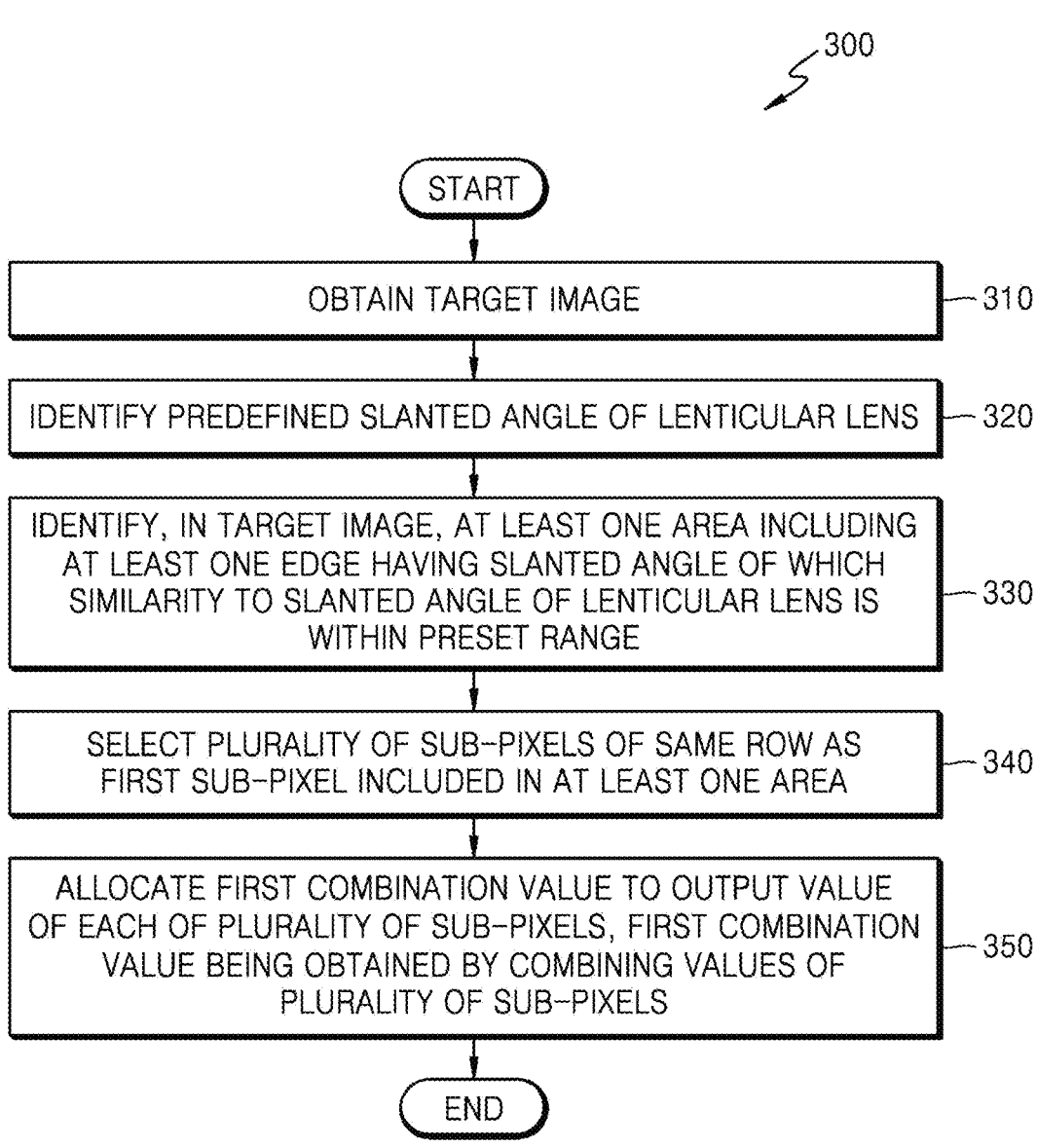

300

START

OBTAIN TARGET IMAGE ⎯ 310

IDENTIFY PREDEFINED SLANTED ANGLE OF LENTICULAR LENS ⎯ 320

IDENTIFY, IN TARGET IMAGE, AT LEAST ONE AREA INCLUDING AT LEAST ONE EDGE HAVING SLANTED ANGLE OF WHICH SIMILARITY TO SLANTED ANGLE OF LENTICULAR LENS IS WITHIN PRESET RANGE ⎯ 330

SELECT PLURALITY OF SUB-PIXELS OF SAME ROW AS FIRST SUB-PIXEL INCLUDED IN AT LEAST ONE AREA ⎯ 340

ALLOCATE FIRST COMBINATION VALUE TO OUTPUT VALUE OF EACH OF PLURALITY OF SUB-PIXELS, FIRST COMBINATION VALUE BEING OBTAINED BY COMBINING VALUES OF PLURALITY OF SUB-PIXELS ⎯ 350

END

400 — TARGET IMAGE

440 — LENS SLANTED ANGLE

410 — GRAY SCALE IMAGE

420 — SLANTED ANGLE-BASED EDGE DISTORTION DETECTION MODULE

422 — EDGE DETECTION

424 — EDGE IMAGE

426 — ANGLE-BASED MASK IMAGE GENERATION

428 — ANGLE-BASED MASK IMAGE

430

450 — EDGE DISTORTION PROCESSING MODULE

FIG. 10

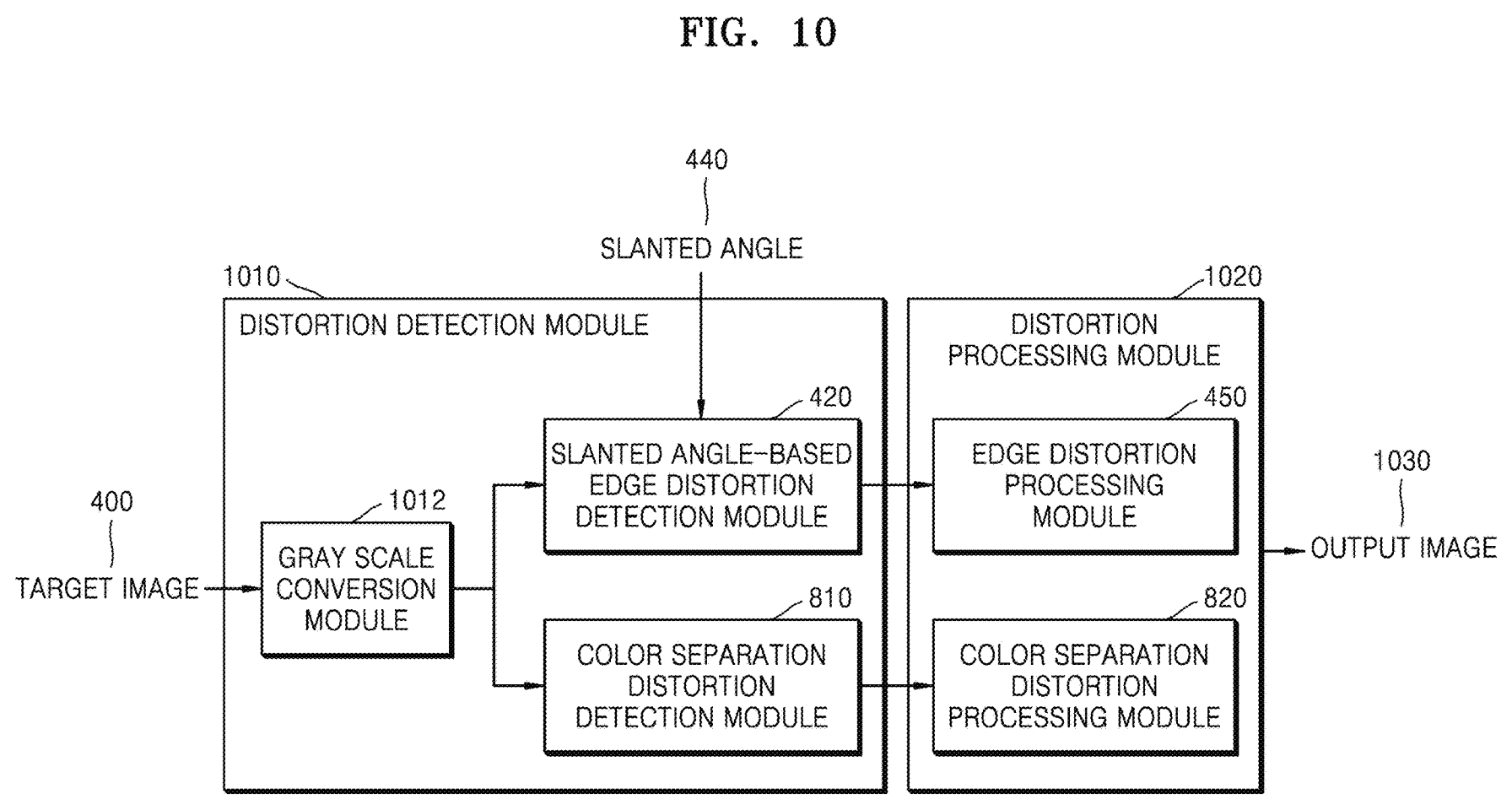

TARGET IMAGE 400

DISTORTION DETECTION MODULE 1010

GRAY SCALE CONVERSION MODULE 1012

SLANTED ANGLE-BASED EDGE DISTORTION DETECTION MODULE 420

COLOR SEPARATION DISTORTION DETECTION MODULE 810

SLANTED ANGLE 440

DISTORTION PROCESSING MODULE 1020

EDGE DISTORTION PROCESSING MODULE 450

COLOR SEPARATION DISTORTION PROCESSING MODULE 820

OUTPUT IMAGE 1030

METHOD AND DISPLAY APPARATUS FOR CORRECTING DISTORTION CAUSED BY LENTICULAR LENS

CROSS-REFERENCE TO RELATED APPLICATION(S)

This application is a continuation application, claiming priority under § 365 (c), of an International application No. PCT/KR2024/009017, filed on Jun. 27, 2024, which is based on and claims the benefit of a Korean patent application number 10-2023-0084483, filed on Jun. 29, 2023, in the Korean Intellectual Property Office, and of a Korean patent application number 10-2023-0154738, filed on Nov. 9, 2023, in the Korean Intellectual Property Office, the disclosure of each of which is incorporated by reference herein in its entirety.

TECHNICAL FIELD

The disclosure relates to a method and electronic device for correcting distortion caused by a lenticular lens.

BACKGROUND ART

In order to generate a three-dimensional (3D) effect, an optical effect, or other visual effect in a display field, a special type of lens such as a lenticular lens may be used. A display device may output a plurality of images such that different images can be viewed depending on view positions of a user, by using a characteristic of the lenticular lens. For example, the display device outputs a first image to pixels which can be viewed at a first view position, and may simultaneously output a second image to pixels which can be viewed at a second view position. In this case, the first image may be viewed to a viewer at the first view position, and the second image may be viewed to a viewer at the second view position.

A display device using the characteristic of the lenticular lens is a glasses-free 3D display device and may provide a 3D image to a viewer. Due to the characteristic of the lenticular lens, different images may be viewed to a left eye and a right eye of the viewer. For example, the display device outputs a first image to pixels which can be viewed to the left eye of the viewer, and may simultaneously output a second image to pixels which can be viewed to the right eye. In this case, due to a difference between the first image viewed to the left eye of the viewer and the second image viewed to the right eye, the viewer may recognize that the viewer is watching the 3D image.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a method, a system, a device, or a computer program stored in a computer-readable storage medium.

Additional aspects will be set forth in part in the description which follows and, in part, will be apparent from the description, or may be learned by practice of the presented embodiments.

In accordance with an aspect of the disclosure, a method performed by a display device including a lenticular lens is provided. The method includes obtaining, by the display device, a target image, identifying, by the display device, a predefined slanted angle of the lenticular lens, identifying, by the display device, in the target image, at least one area including at least one edge having a slanted angle of which similarity to the slanted angle of the lenticular lens is within a preset range, selecting, by the display device, a plurality of sub-pixels of a same row as a first sub-pixel included in the identified at least one area, allocating, by the display device, a first combination value to an output value of each of the plurality of sub-pixels, the first combination value being obtained by combining values of the plurality of sub-pixels.

In accordance with another aspect of the disclosure, one or more non-transitory computer-readable storage media storing one or more computer programs including computer-executable instructions that, when executed by one or more processors of an display device individually or collectively, cause the display device to perform operations are provided. The operations include obtaining, by the display device, a target image, identifying, by the display device, a predefined slanted angle of the lenticular lens, identifying, by the display device, in the target image, at least one area including at least one edge having a slanted angle of which similarity to the slanted angle of the lenticular lens is within a preset range, selecting, by the display device, a plurality of sub-pixels of a same row as a first sub-pixel included in the identified at least one area, and allocating, by the display device, a first combination value to an output value of each of the plurality of sub-pixels, the first combination value being obtained by combining values of the plurality of sub-pixels.

In accordance with another aspect of the disclosure, a display device is provided. The display device includes a lenticular lens, a display, memory storing one or more computer programs, and one or more processors communicatively coupled to the display and the memory, wherein one or more computer programs include computer-executable instructions that, when executed by the one or more processors individually or collectively, cause the display device to identify a predefined slanted angle of the lenticular lens, identify, in the target image, at least one area including at least one edge having a slanted angle of which similarity to the slanted angle of the lenticular lens is within a preset range, select a plurality of sub-pixels of a same row as a first sub-pixel included in the identified at least one area, allocate a first combination value to an output value of each of the plurality of sub-pixels, the first combination value being obtained by combining values of the plurality of sub-pixels.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3 is a flowchart of an example in which a display device corrects distortion due to a lenticular lens, according to an embodiment of the disclosure;

FIG. 10 is a diagram illustrating an example in which a display device detects an area in which distortion due to a lenticular lens occurs, and corrects the distortion, according to an embodiment of the disclosure;

The same reference numerals may be used to represent the same elements throughout the drawings.

MODE FOR INVENTION

Figure 1:
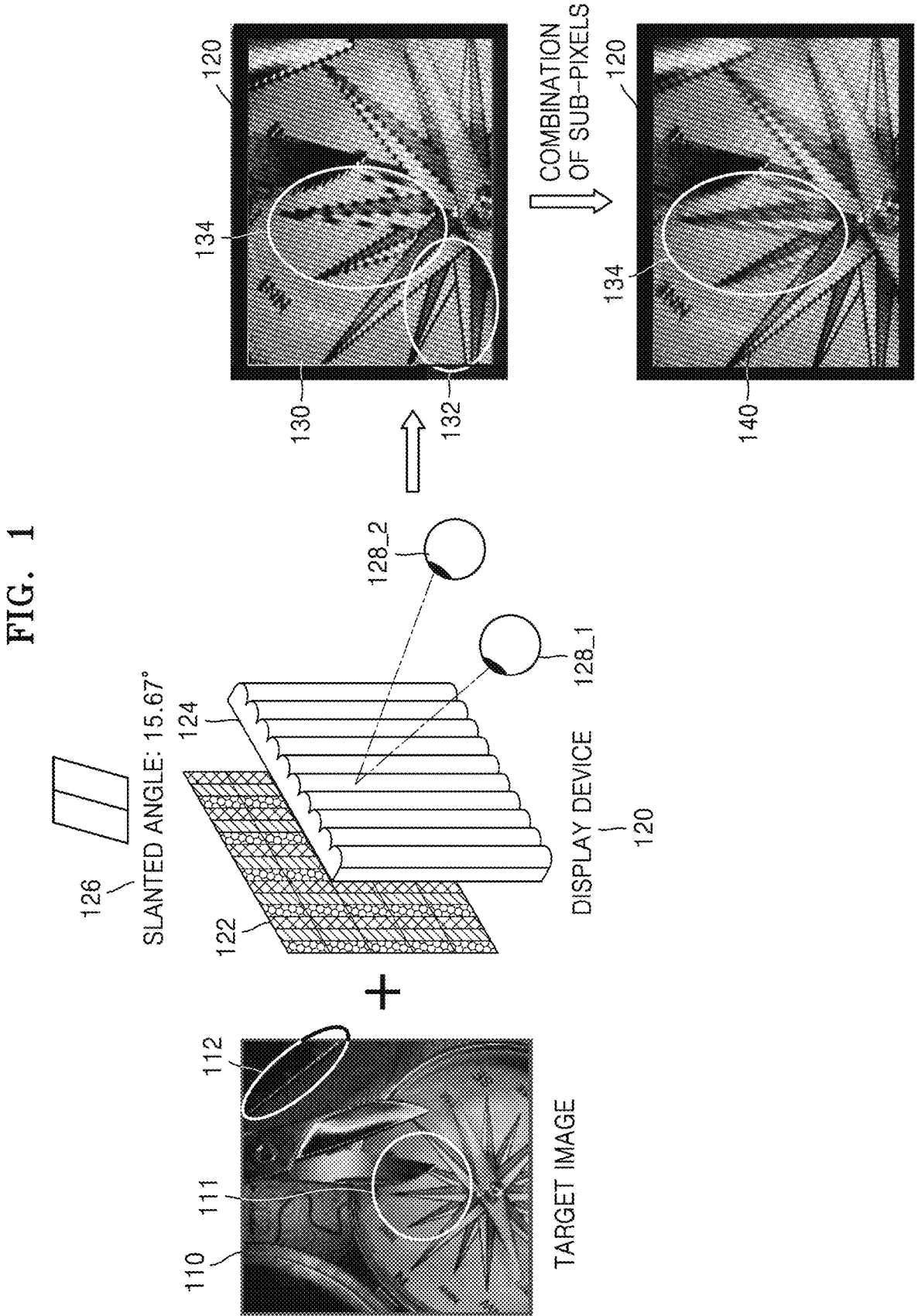
FIG. 1 is a diagram illustrating an example in which a display device including a lenticular lens outputs a target image, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, numerals (e.g., "first", "second", and the like) in descriptions of the specification are used only to distinguish one element from another element.

Throughout the specification, it will also be understood that, when an element is referred to as being "connected to" or "coupled with" another element, it can be directly connected to or coupled with the other element, or it can be indirectly connected to or coupled with the other element by having an intervening element interposed therebetween. Here, "connection" may include wireless connection or wired connection.

In the disclosure, regarding an element represented as a "-er/or (unit)", or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another element.

Throughout the disclosure, the expression "at least one of a, b or c" indicates only a, only b, only c, both a and b, both a and c, both b and c, all of a, b, and c, or variations thereof. Throughout the disclosure, the expression "at least one of a or b" indicates only a, only b, both a and b, or variations thereof. Throughout the disclosure, the expression "a (or, b, c)" indicates only a, only b, only c, both a and b, both a and c, both b and c, all of a, b, and c, or variations thereof.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a diagram illustrating an example in which a display device including a lenticular lens outputs a target image, according to an embodiment of the disclosure.

Referring to FIG. 1, a display device 120 may include an electronic device including an image output module (e.g., a display 122) and a lens. For example, the display device 120 includes an advertisement monitor, a gaming monitor, a television, an electronic photo frame, a notebook, a desktop computer, a virtual reality (VR) device, an augmented reality (AR) device, and a wearable device. According to an embodiment of the disclosure, the display device 120 may be an electronic device including a lenticular lens 124. In this case, an image the display device 120 outputs on the display 122 may be recognized to viewpoints 128_1 and 128_2 of a viewer via the lenticular lens 124.

In the disclosure, the lenticular lens 124 may include a lens including a plurality of lenticules with a convex shape. One surface of the lenticular lens 124 may be a pattern surface with a convex shape, and the other surface may be a plane surface which can be adhered to the image output module Referring to FIG. 1, the lenticular lens 124 may include a lens array in which a plurality of column-type lenses are arrayed in parallel and repeatedly For example, a top surface and a bottom surface of the plurality of column-type lenses each have an arch shape, a semicircle shape, or a semielliptical shape, but the disclosure is not limited thereto.

In the disclosure, the lenticular lens 124 may include a lens configured to allow pixels of different sets from among a plurality of pixels (or sub-pixels) of the display 122 to be viewed, according to positions of viewpoints 128_1 and 128_2 (e.g., view positions) of the viewer. For example, according to the positions of the viewpoints 128_1 and 128_2 of the viewer, some pixels among a plurality of pixels included in one pitch section of the lenticular lens 124 are zoomed in by the pitch section and viewed, and other pixels are not viewed. For example, as the positions of the viewpoints 128_1 and 128_2 of the viewer are changed, pixels to be viewed are also changed.

In the disclosure, a pitch of the lenticular lens 124 may include a distance between centers of neighboring lenticules included in the lenticular lens 124, or a distance between a neighboring point to a left lenticule and a neighboring point to a right lenticule with respect to one lenticule. For example, the pitch of the lenticular lens 124 includes a horizontal length of an area corresponding to one lenticule on a plane surface of the lenticular lens 124. The pitch of the lenticular lens 124 may be set (or designed) to determine a density of the plurality of lenticules of the lenticular lens 124, and may have an effect on a visual effect and a resolution. For example, with respect to lenticular lenses 124 having the same size, a lenticular lens 124 having a short pitch may be configured of a relatively large number of lenticules, and a lenticular lens 124 having a long pitch are configured of a relatively small number of lenticules.

In the disclosure, a pitch section of the lenticular lens 124 may include a section corresponding to one lenticule from among the plurality of lenticules of the lenticular lens 124 in the plane surface of the lenticular lens 124 or a target image. For example, the plane surface of the lenticular lens 124 including the plurality of lenticules includes a plurality of pitch sections respectively corresponding to the plurality of lenticules. According to an embodiment of the disclosure, a pitch section of the lenticular lens 124 may include an area corresponding to one lenticule from among the plurality of lenticules of the lenticular lens 124 in a target image output by the display device. For example, the target image includes a plurality of pitch sections respectively corresponding to the plurality of lenticules of the lenticular lens 124.

The lenticular lens 124 may be obliquely attached (or combined, stacked) to the display 122. For example, the lenticular lens 124 rotates by a slanted angle 126 around a center axis that is a random line penetrating the plane surface of the lenticular lens 124 and may be attached. The lenticular lens 124 may be directly attached (or combined, stacked) to the display 122, but the disclosure is not limited thereto, and other configuration or other layer may be arranged between the lenticular lens 124 and the display 122.

In the disclosure, the slanted angle 126 of the lenticular lens 124 may include an angle with which the lenticular lens 124 is slanted with respect to the display 122. For example, the slanted angle 126 of the lenticular lens 124 is an angle with which the plurality of vertical column-type lenses being arrayed in parallel are slanted, and includes an angle between a vertical line of the display 122 and a perpendicular direction of the slanted lenticular lens 124. The pitch and the slanted angle of the lenticular lens 124 may be determined and designed, in consideration of an optical characteristic and a purpose of use of the lenticular lens 124.

The display device 120 may output a target image 110 via the display 122. The target image 110 may be a still image or a video. For example, the target image 110 includes an image frame that constitutes a video. According to an embodiment of the disclosure, the target image 110 may include an image after random processing has been performed on an original image (e.g., an input image being input to the display device 120) which is identified by the display device 120. For example, the target image 110 includes an image that is generated by performing preprocessing such as color correction, emphasis processing, size adjustment, resolution adjustment, or the like on the original image, according to a setting value (e.g., a parameter value).

The target image 110 may include a plurality of pixels. For example, the target image 110 having a resolution of m×n (where, m and n are natural numbers) may include m×n pixels. Each pixel included in the target image 110 may include a plurality of sub-pixels. In the disclosure, a sub-pixel is a smaller element (e.g., a sub-pixel) that constitutes one pixel, and each sub-pixel may correspond to one color component. For example, one pixel includes a sub-pixel of a Red color (hereinafter, an R sub-pixel), a sub-pixel of a Green color (hereinafter, a G sub-pixel), and a sub-pixel of a Blue color (hereinafter, a B sub-pixel). In this case, the target image 110 having a resolution of m×n may include (3 m)×n sub-pixels.

Data of a pixel included in the target image 110 may include values of sub-pixels constituting the pixel. A value of a sub-pixel may correspond to intensity or brightness of a color component in the pixel. For example, data of a first pixel of the target image 110 may include a value of an R sub-pixel of the first pixel, a value of a G sub-pixel, and a value of a B sub-pixel, and the value of the R sub-pixel may correspond to intensity or brightness of a Red color in the first pixel.

The display device 120 may output light according to values of sub-pixels via sub-pixel modules of the display 122 which respectively correspond to sub-pixels of the target image 110. According to an embodiment of the disclosure, the display device 120 may perform random processing on the target image 110, thereby allocating, as an output value, a particular value to a sub-pixel included in the target image 110. In this case, the display device 120 may output light according to the particular value allocated as the output value of the sub-pixel, via a sub-pixel module of the display 122 which corresponds to the sub-pixel.

Due to an optical characteristic of the lenticular lens 124, a difference between an image output to the display 122 and an image recognized to the viewpoints 128_1 and 128_2 of the viewer may occur. That is, even when the display device 120 outputs the intact target image 110 onto the display 122, distortion may occur in the image actually recognized to the viewpoints 128_1 and 128_2 of the viewer via the lenticular lens 124. According to an embodiment of the disclosure, the display device 120 may pre-identify an area in which distortion due to the lenticular lens 124 occurs in the target image 110, may perform random processing on the identified area so as to correct the distortion, and then may output the target image 110, thereby providing the viewer with an image in which the distortion is corrected.

According to an embodiment of the disclosure, the display device 120 may identify an area of an edge having a similar slanted angle as the slanted angle 126 of the lenticular lens 124 as the area in which distortion due to the lenticular lens 124 occurs, from among edges in the target image 110. In the disclosure, an edge may include a point where two different areas or objects meet in an image, or a boundary and contour of an object. For example, the edge includes a point (e.g., a line or a broken line) at which variation in a value of contrast (brightness) or a color value sharply increases in the image.

According to an embodiment of the disclosure, the edge having a similar slanted angle as the slanted angle 126 of the lenticular lens 124 may include an edge that is similarly slanted by a slant level of the lenticular lens 124. For example, the edge having a similar slanted angle as the slanted angle 126 of the lenticular lens 124 includes at least one edge having a slanted angle of which similarity to the slanted angle 126 is within a present range. For example, the slanted angle of which similarity to the slanted angle 126 is within the present range may include a slanted angle of which difference with respect to the slanted angle 126 of the lenticular lens 124 is equal to or less than a preset reference value.

Due to an optical characteristic of the lenticular lens 124, the image that is actually recognized to the viewpoints 128_1 and 128_2 of the viewer via the lenticular lens 124 may have a phenomenon in which the at least one edge having a slanted angle of which similarity to the slanted angle of the lenticular lens 124 is within the present range looks disconnected or looks like a step. As shown in a screen 130 of the display device 120 of FIG. 1, when the slanted angle of the lenticular lens 124 is 15.67°, the disconnection phenomenon does not occur in a first area 132 including a black straight line (i.e., an edge having a different slanted angle to the slanted angle of the lenticular lens 124) in a similar direction to a horizontal direction, whereas the disconnection phenomenon occurs in a second area 134 including a black straight line (i.e., an edge having a similar slanted angle to the slanted angle of the lenticular lens 124) that is similarly slanted by the slant level of the lenticular lens 124.

Distortion with which an edge looks disconnected (hereinafter, also referred to as slanted angle-based edge distortion) may be distortion that occurs because only some sub-pixels from among a plurality of sub-pixels constituting the edge are zoomed in by a corresponding pitch section and are viewed to the viewpoints 128_1 and 128_2 of the viewer, and other sub-pixels are not viewed to the viewpoints 128_1 and 128_2 of the viewer. Therefore, according to an embodiment of the disclosure, the display device 120 may identify an area 111 including an edge having the similar slanted angle to the slanted angle of the lenticular lens 124 in the target image 110, as an area of distortion.

According to an embodiment of the disclosure, the display device 120 may identify an area 112 of a white line with a slim thickness in the target image 110, as an area of distortion. In the disclosure, an area of a line may include an area including sub-pixels corresponding to the line in an image. In the disclosure, a white line may include a line consisting of an R sub-pixel, a G sub-pixel, and a B sub-pixel which have similar values (i.e., brightness values) equal to or greater than a preset value, or a line being recognizable as a white color to a viewer, in terms of cognition. The similar values (i.e., brightness values) may include values whose difference is equal to or less than a preset value. The white line may include a similar number of R sub-pixels, G sub-pixels, and B sub-pixels. For example, a difference between the number of R sub-pixels, the number of G sub-pixels, and the number of B sub-pixels included in the white line is equal to or less than a preset number.

In the disclosure, a line with a small thickness may include a line having a thickness equal to or less than a preset thickness. For example, the line with a small thickness includes a line whose width value is equal to or less than a preset value, a line in which the number of pixels (or sub-pixels) included in a width of the line is equal to or less than a preset number, or a line in which a pixel-unit width value is equal to or less than a preset pixel-unit width value (e.g., 1 pixel, 2 pixels, and the like). The preset thickness may be determined to be an absolute value or a relative value. According to an embodiment of the disclosure, the preset thickness may be determined to be a particular value (e.g., 1 pixel), regardless of other factors and setting values. According to an embodiment of the disclosure, the preset thickness may be determined to be a value, i.e., a relative value, which is calculated (or determined) based on other factors such as a size of an image, resolution of the image, a thickness of lines included in the image, a pitch of the lenticular lens 124, and the like. For example, the preset thickness includes a thickness corresponding to a preset ratio (e.g., 10%), compared to the pitch of the lenticular lens 124. According to an embodiment of the disclosure, the preset thickness may include a thickness at which a red green blue (RGB) separation phenomenon may occur, in terms of cognition.

Due to an optical characteristic of the lenticular lens 124, the image that is actually recognized to the viewpoints 128_1 and 128_2 of the viewer via the lenticular lens 124 may have a color separation phenomenon in which RGB components are separately recognized in an area of a white line with a small thickness. Distortion in which RGB color separation is viewed in the area of the white line with a small thickness (hereinafter, also referred to as color separation distortion) may be distortion that occurs because only some sub-pixels from among a plurality of sub-pixels constituting the white line are zoomed in in a corresponding pitch section and are viewed to the viewpoints 128_1 and 128_2 of the viewer, and other sub-pixels are not viewed to the viewpoints 128_1 and 128_2 of the viewer. For example, the distortion in which RGB color separation is viewed in the area of the white line with a small thickness includes a phenomenon in which color components of a sub-pixel unit of the white line are separate as a color component of a sub-pixel zoomed in in a pitch section and viewed is emphasized.

After the display device 120 identifies, from the target image 110, the area of distortion as described above, the display device 120 may perform random processing to correct the distortion of the identified area. According to an embodiment of the disclosure, the display device 120 may correct a value of at least one sub-pixel related to the area of the distortion and output, thereby outputting the target image 110 in which the distortion is corrected. At least one sub-pixel related to an area may include a sub-pixel included in the area, a sub-pixel in the same row or column of the sub-pixel included in the area, or a sub-pixel corresponding to the same pitch section as the sub-pixel included in the area.

According to an embodiment of the disclosure, in order to correct and alleviate distortion due to the optical characteristic of the lenticular lens 124, the display device 120 may correct a value of at least one sub-pixel related to an area of distortion by using a combination value calculated by combining values of a plurality of sub-pixels related to the area of distortion. According to an embodiment of the disclosure, that the values of the plurality of sub-pixels are combined may include that a first combination value is calculated (or determined) based on the plurality of sub-pixels. According to an embodiment of the disclosure, that the values of the plurality of sub-pixels are combined may include that a first combination value is calculated based on a value of a first sub-pixel set from among the plurality of sub-pixels, and a second combination value is calculated based on a value of a second sub-pixel set from among the plurality of sub-pixels.

The display device 120 may allocate a combination value as an output value of the at least one sub-pixel related to the area of distortion, the combination value being obtained by combining values of the plurality of sub-pixels. In this case, the display device 120 may output the allocated output value for the at least one sub-pixel related to the area of distortion in the intact target image 110, and may output existing values (e.g., original values) for sub-pixels of other area, via the display 122.

Referring to FIG. 1, the display device 120 may output a combination value of sub-pixels for an area including a disconnection phenomenon, thereby providing a viewer with a target image such as a screen 140 in which the disconnection phenomenon is corrected. For example, the disconnection phenomenon in the second area 134 including the black straight line (i.e., the edge having a similar slanted angle to the slanted angle of the lenticular lens 124) that is similarly slanted by the slant level of the lenticular lens 124 is alleviated. A method by which the display device 120 corrects distortion in which some areas of an image look disconnected will be described in detail with reference to FIG. 3 below.

The images displayed on the screens 130 and 140 of FIG. 1 are view images that are viewed to the viewpoints 128_1 and 128_2 of the viewer before and after distortion correction processing is performed, and may be images obtained by zooming in a particular area of the target image 110, for convenience of descriptions.

FIG. 1 illustrates an example in which the display device 120 performs distortion correction processing on the target image 110 and then outputs the target image 110 on which the distortion correction processing has been performed, but the disclosure is not limited thereto. For example, an electronic device (e.g., a server device) that can be connected to the display device 120 or can communicate by wire or wirelessly may perform distortion correction processing on the target image 110, provides the target image 110 on which the distortion correction processing has been performed to the display device 120, and the display device 120 outputs the target image 110 received from the electronic device. An operation in which the display device 120 interoperates with an external electronic device and outputs a target image on which distortion correction processing has been performed will be described in detail with reference to FIG. 12 below.

Hereinafter, with reference to FIGS. 2A to 2E, 3, 4, and 5A to 5D, an operation in which the display device 120 corrects distortion in which an edge having a similar slanted angle to a slanted angle of the lenticular lens 124 looks disconnected (hereinafter, also referred to as slanted angle-based edge distortion) will be first described, and with reference to FIGS. 6A to 6C, 7, 8, and 9A to 9C, an operation in which the display device 120 corrects distortion in which RGB color separation is viewed in an area of a white line with a small thickness (hereinafter, also referred to as color separation distortion) will be described.

FIGS. 2A, 2B, 2C, 2D, and 2E are diagrams illustrating an example of distortion due to a lenticular lens according to one or more embodiments of the disclosure.

When describing FIGS. 2A to 2E, redundant descriptions with respect to FIG. 1 may be skipped.

Figure 2A:
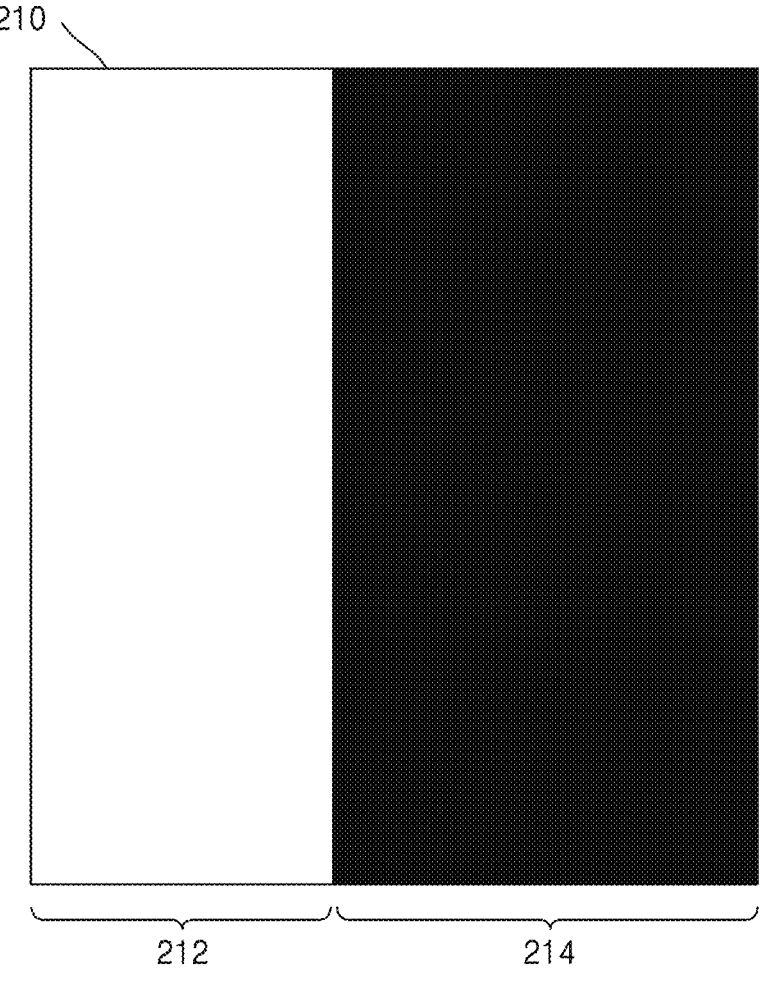
FIGS. 2A, 2B, 2C, 2D, and 2E are diagrams illustrating an example of distortion due to a lenticular lens according to one or more embodiments of the disclosure.

FIG. 2A may indicate a target image 210 including a white area 212 and a black area 214 according to an embodiment of the disclosure.

Referring to FIG. 2A, in the target image 210, sub-pixels included in the white area 212 may have a high value (e.g., a maximum value) as an output value, and sub-pixels included in the black area 214 may have a low value (e.g., 0) as an output value. The display device may detect, as an edge, a point and a boundary at which the white area 212 meets the black area 214. For example, the edge is detected as a line or an area with a width of a preset value (e.g., 1 pixel). For example, the edge is detected as a line (or an area) including a part of the black area 214 contacting the boundary, may be detected as a line (or an area) including a part of the white area 212 contacting the boundary, or may be detected as a line (or an area) including a part of the black area 214 and a part of the white area 212 which contact the boundary. A slanted angle of the edge may be an angle indicating a slant level with respect to a vertical axis of the display, and in this case, the slanted angle of the edge which is detected from the target image 210 of FIG. 2A may be 0 degree.

Figure 2B:
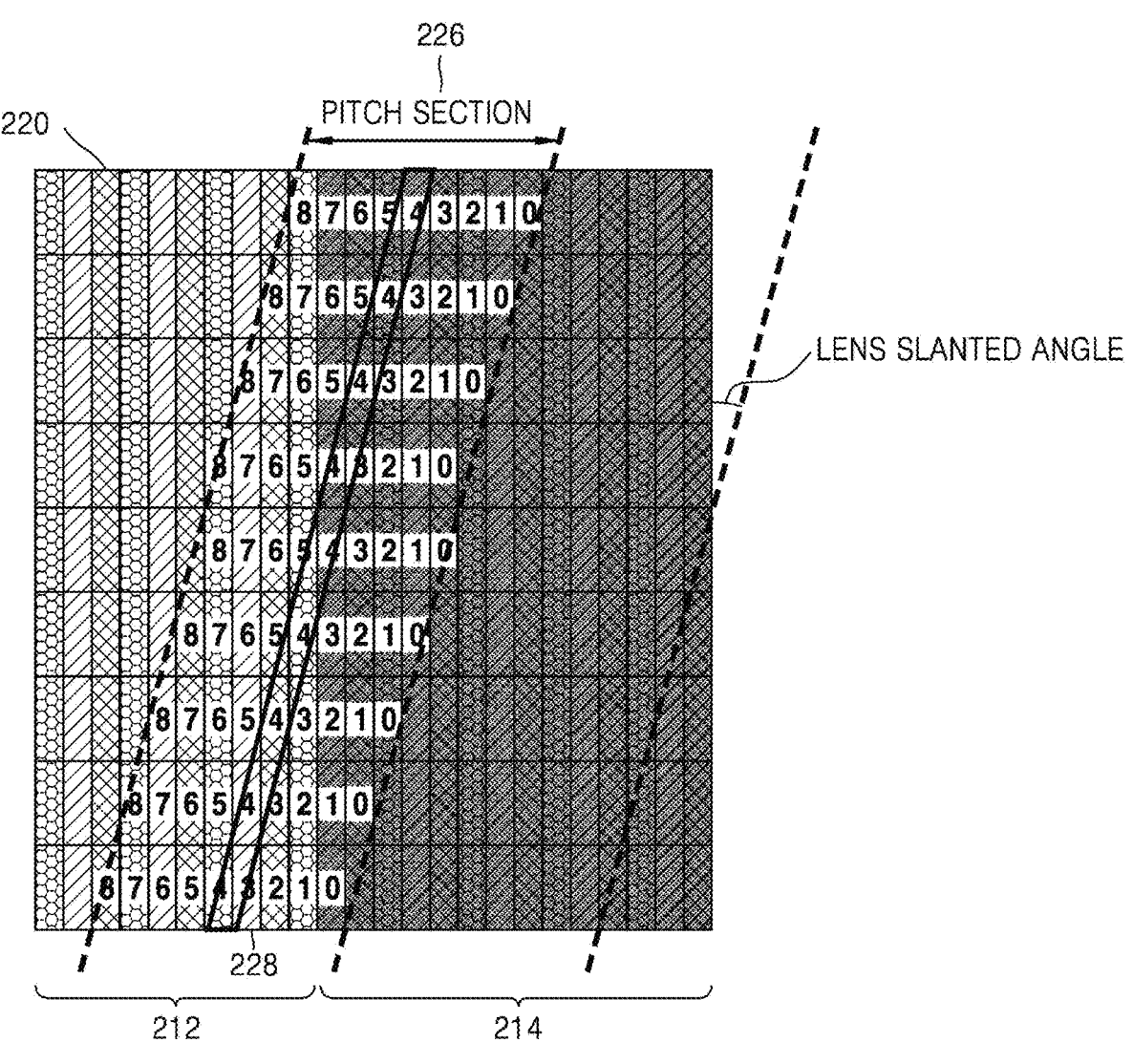

The display device may output the target image 210 on the display. FIG. 2B may indicate a target image 220 output on a display including a plurality of sub-pixel modules. For example, the plurality of sub-pixel modules of the display may include a module to output a Red color, a module to output a Green color, and a module to output a Blue color. The sub-pixel modules of the display may directly emit light according to an output value (e.g., a brightness value) as a light source, may adjust a transmittance level of backlight, according to the brightness level, or may output light by adjusting a reflection level of light of the light source, according to the brightness level.

Each sub-pixel module of the display may output light, according to an output value of a corresponding sub-pixel in a target image. For example, on the display, sub-pixel modules corresponding to the white area 212 of the target image outputs light, according to an output value of a plurality of sub-pixels included in the white area 212. Referring to FIG. 2B, sub-pixel modules corresponding to the white area 212 may output light with high brightness or bright light (e.g., light of maximum brightness), according to a high output value of the plurality of sub-pixels included in the white area 212. For example, on the display, sub-pixel modules corresponding to the black area 214 of the target image may output light, according to an output value of a plurality of sub-pixels included in the black area 214. Referring to FIG. 2B, sub-pixel modules corresponding to the black area 214 may output light with low brightness or dim light, according to a low output value of the plurality of sub-pixels included in the black area 214.

FIG. 2B may show the target image 220 in which color components are separate in units of sub-pixels according to an embodiment of the disclosure.

Referring to FIG. 2B, a hexagonal hatched sub-pixel may indicate an R sub-pixel, a diagonal hatched sub-pixel may indicate a G sub-pixel, and a rhombus-matched sub-pixel may indicate a B sub-pixel.

Figure 2C:
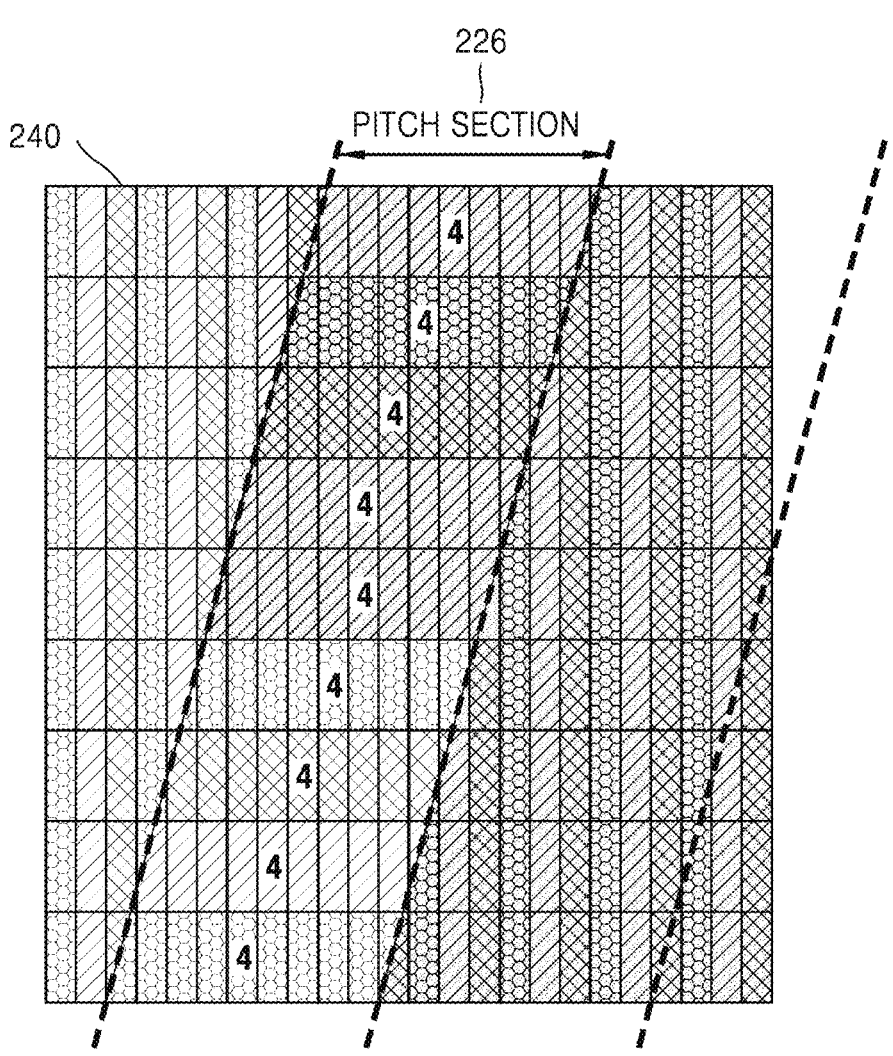
Figure 2D:
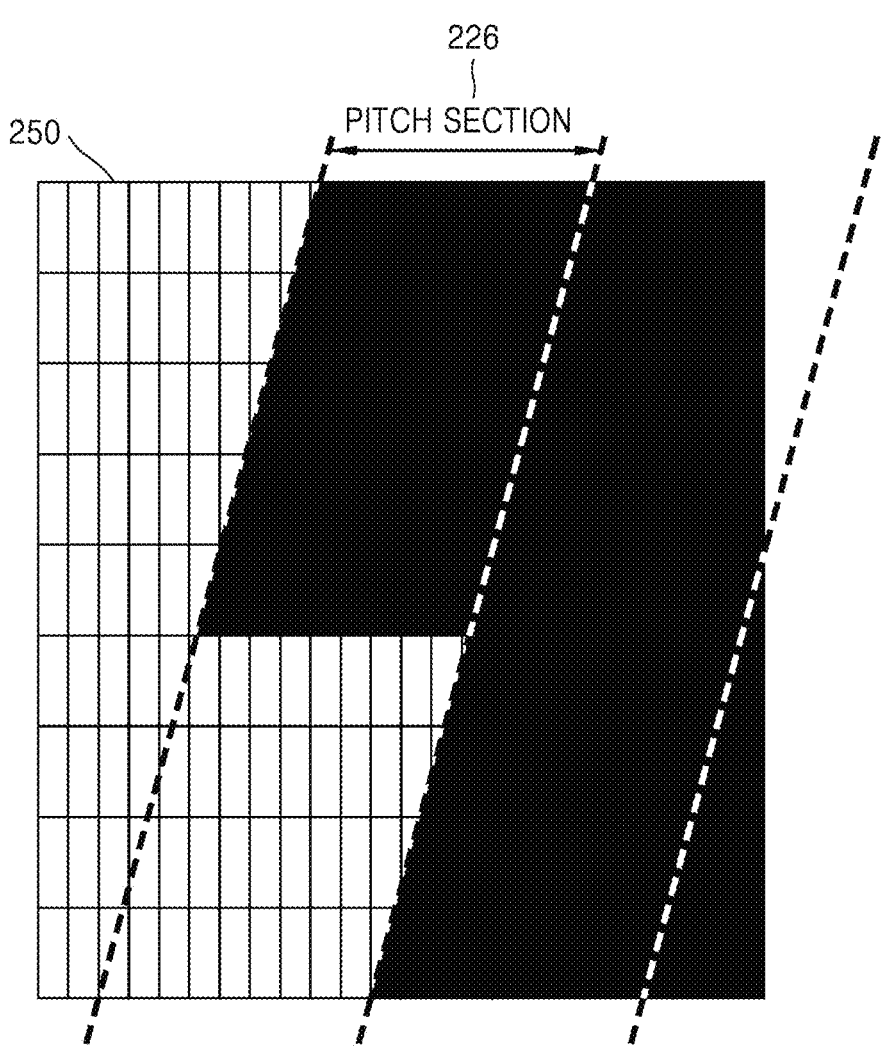

Referring to FIGS. 2B to 2D, a diagonal broken line may indicate a contour (or a boundary) of a plurality of lenticules of a lenticular lens combined (or attached, stacked, integrated) to the display. For example, the diagonal broken line in FIGS. 2B to 2D indicates a start line and an end line of each lenticule in the lenticular lens. For example, the diagonal broken line in FIGS. 2B to 2D includes concave points of the lenticular lens including convex lenticules, and may be shown as a straight line slanted by a slanted angle of the lenticular lens.

Referring to FIGS. 2B to 2D, the lenticular lens with its lenticules being slanted by the slanted angle may be combined with the display. Referring to FIG. 2B, the slanted angle of the lenticular lens may include an angle between a vertical line (e.g., a perpendicular line) of the display and the diagonal broken line indicating the contour of the lenticules of the lenticular lens.

Referring to FIG. 2B, a pitch section 226 of the lenticular lens may indicate each section between diagonal broken lines. A plurality of sub-pixels may be included in the pitch section 226 of the lenticular lens. For example, the plurality of sub-pixels are included in an image area corresponding to the pitch section 226 of the lenticular lens. Descriptions of other pitch sections may be skipped in descriptions of FIGS. 2B to 2D, and descriptions of the pitch section 226 may be equally applied to the other pitch sections.

Referring to FIG. 2B, numbers respectively displayed in the plurality of sub-pixels in the pitch section 226 of the lenticular lens may indicate an identification number (or, an index number, an identifier) of a view position at which each processor is viewed. For example, when a viewer views, at a fourth view position, the target image 220 output on the display via the lenticular lens, only sub-pixels 228 marked with 4 from among the plurality of sub-pixels included in the pitch section 226 may be viewed to a viewpoint of the viewer, and other sub-pixels may not be viewed. In FIGS. 2B and 2C, identification numbers of view positions for sub-pixels other than the pitch section 226 may be skipped.

FIGS. 2C and 2D may indicate view images 240 and 250 of a case in which the target image 220 output on the display is viewed at the fourth view position according to one or more embodiments of the disclosure.

The view image 240 of FIG. 2C may be an image indicating color components that are separate in units of sub-pixels, and the view image 250 of FIG. 2D may indicate an image in which color components are combined and that is actually viewed to a viewer.

As shown in the view image 240 of FIG. 2C, at the fourth view position, the sub-pixels 228 marked with 4 may be zoomed in in the pitch section 226 and viewed. Referring to FIGS. 2A and 2B, sub-pixels from a first row to a fifth row from among the sub-pixels 228 marked with 4 in the pitch section 226 are included in the black area 214 of the target image 210, and sub-pixels from a sixth row to a ninth row are included in the white area 212. In this case, as shown in a view image 240 of FIG. 2C, in the pitch section 226, sub-pixels output with a low brightness value (e.g., 0) may be viewed from a first row to a fifth row, and sub-pixels output with a high value (e.g., a maximum value) may be viewed from a sixth row to a ninth row.

When the viewer actually views, RGB color components are mixed and recognized, and thus, as shown in a view image 250 of FIG. 2D, it may be viewed (or recognized) that a black color is output from an area from the first row to the fifth row, and a white color is output from the sixth row to the ninth row. Therefore, even when the display device outputs the target image 210 having an edge in a vertical direction to the display, the viewer may view the view image 250 in which distortion such as a step phenomenon or a disconnection phenomenon occurs at the edge due to the lenticular lens.

Figure 2E:
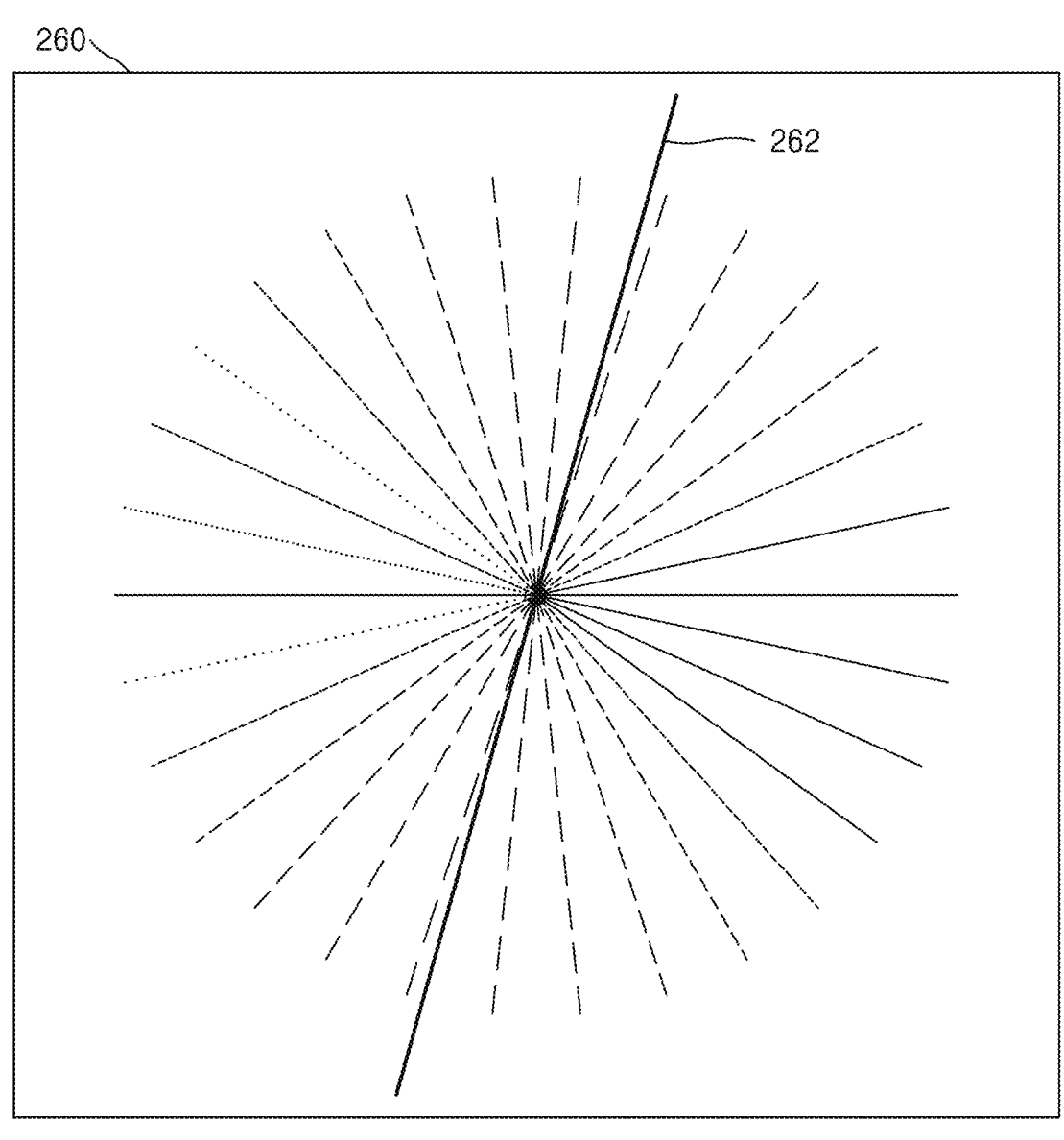

A line such as a contour of an object included in an image may be detected as an edge. FIG. 2E may indicate an image 260 that is viewed to a viewer via a lenticular lens, when the display device outputs, to the display, an image including straight lines having various slanted angles. Each of the straight lines included in the image may correspond to an edge. An angle between a line 262 indicating a slant level of the lenticular lens and a vertical line (or, a lengthwise line, a horizontal line) of the display may be a slanted angle of the lenticular lens. Referring to FIG. 2E, a disconnection phenomenon may occur in a straight line having a similar slanted angle to the slanted angle of the lenticular lens, and as the slanted angle of the straight line becomes more similar to the slanted angle of the lenticular lens, a disconnection phenomenon may be further apparent.

FIG. 3 is a flowchart of an example in which a display device corrects distortion due to a lenticular lens, according to an embodiment of the disclosure.

When describing FIG. 3, redundant descriptions with respect to at least one of FIGS. 1, and 2A to 2E may be skipped.

Referring to FIG. 3, a method 300 by which the display device according to an embodiment of the disclosure corrects distortion due to a lenticular lens may include operations 310 to 350. According to an embodiment of the disclosure, operations 310 to 350 may be executed by at least one processor included in the display device. The method 300 by which the display device corrects distortion due to a lenticular lens is not limited to what is shown in FIG. 3, and in one or more embodiments, the method 300 may further include operations not shown in FIG. 3 or may not include some operations.

In operation 310, the display device may obtain a target image. According to an embodiment of the disclosure, the display device may receive the target image from an external device. According to an embodiment of the disclosure, the display device may generate the target image by performing random processing on an input image received from the external device. According to an embodiment of the disclosure, the display device may generate the target image, based on an image signal input via an image input module (e.g., a camera module) included in the display device.

In operation 320, the display device may identify a predefined (or, stored, designed, determined) slanted angle of a lenticular lens. For example, the display device stores, in memory, information about the slanted angle of the lenticular lens. For example, the slanted angle of the lenticular lens is predefined (or, determined, set) in designing the display device.

In order to correct distortion due to the lenticular lens, the display device may identify, select, set, detect, or determine an area of the target image in which distortion occurs. For example, the display device detects the area of distortion in the target image by using predefined random rule, an algorithm, or a model.

According to an embodiment of the disclosure, in operation 330, the display device may identify at least one area including at least one edge having a slanted angle of which similarity to the slanted angle of the lenticular lens is within a preset range. For example, the display device identifies at least one edge that is further slanted within a preset angle or is less slanted within the preset angle with respect to the slanted angle of the lenticular lens.

According to an embodiment of the disclosure, the display device may detect at least one edge from a gray scale image corresponding to the target image, and thus, may obtain (or, generate) an edge image corresponding to the target image. According to an embodiment of the disclosure, the display device may identify, from the edge image, at least one area including the at least one edge having the slanted angle of which similarity to the slanted angle of the lenticular lens is within the preset range. According to an embodiment of the disclosure, the display device may generate (or, obtain) a first mask image indicating the at least one area including the at least one edge having the slanted angle of which similarity to the slanted angle of the lenticular lens is within the preset range, from the edge image, based on the slanted angle of the lenticular lens.

According to an embodiment of the disclosure, the display device may apply the first mask image to the target image, thereby identifying (or, detecting, obtaining), from the target image, the at least one area including the at least one edge having the slanted angle of which similarity to the slanted angle of the lenticular lens is within the preset range. In the disclosure, a mask image may include a binary (or black and white) image used to emphasize or control a particular part or an area of a particular image. For example, the mask image includes an image in which each pixel has one of two values indicating a white color and a black color. The mask image may have the same size as a particular image, and a pixel corresponding to a particular area may be marked as 1 (white color), and other area may be marked as 0 (black color). The mask image may be combined with the particular image or calculated with respect to the particular image, and thus, may be used to emphasize or control a particular part of the particular image.

In order to correct distortion due to the lenticular lens, the display device may perform processing of combining values of sub-pixels on an area related to the distortion. According to an embodiment of the disclosure, the display device may select, set, identify, or determine a plurality of sub-pixels to be combined to correct distortion, from among sub-pixels included in the target image. For example, the display device selects the plurality of sub-pixels to be combined to correct distortion, from among the sub-pixels included in the target image, by using a predefined random rule, an algorithm, or a model. For example, the display device selects a plurality of sub-pixels to be combined, based on different rules, algorithms, or models, according to types of distortion.

According to an embodiment of the disclosure, in operation 340, the display device may select a plurality of sub-pixels of the same row as a first sub-pixel included in the at least one area identified in operation 330. For example, a sub-pixel in the same row as the first sub-pixel includes a sub-pixel positioned in the same row as the first sub-pixel, a sub-pixel included in the same row as the first sub-pixel, or a sub-pixel positioned in a lengthwise direction (or, a horizontal direction) with respect to the first sub-pixel. The plurality of sub-pixels in the same row as the first sub-pixel may include the first sub-pixel.

According to an embodiment of the disclosure, the display device may identify a predefined pitch of the lenticular lens. For example, the display device stores, in the memory, information about the pitch of the lenticular lens. For example, the pitch of the lenticular lens is predefined (or determined, set) in designing the display device.

According to an embodiment of the disclosure, a plurality of pitch sections of the lenticular lens may be determined based on the slanted angle and the pitch of the lenticular lens. The display device may store information about the plurality of pitch sections of the lenticular lens. The information about the plurality of pitch sections of the lenticular lens may include information about which sub-pixels are included in each pitch section, or information about whether sub-pixels are included in a same pitch section. The plurality of pitch sections of the lenticular lens may be determined based on the slanted angle of the lenticular lens and the pitch of the lenticular lens.

According to an embodiment of the disclosure, the display device may select a plurality of sub-pixels (e.g., sub-pixels positioned in the same row) in the same row as a first sub-pixel in a pitch section including the first sub-pixel from among the plurality of pitch sections of the lenticular lens. For example, the display device selects the plurality of sub-pixels included in the same row and the same pitch section as the first sub-pixel. For example, the display device selects all sub-pixels included in the same row and the same pitch section as the first sub-pixel, as sub-pixels to be combined.

According to an embodiment of the disclosure, a sub-pixel in a pitch section (i.e., the sub-pixel included in the pitch section) may include only a sub-pixel whose area is completely included within the pitch section. According to an embodiment of the disclosure, the sub-pixel included in the pitch section may include a sub-pixel whose part is included in the pitch section or a sub-pixel that is included in the pitch section with at least a preset area or more.

In operation 350, the display device may allocate a first combination value to an output value of each of the plurality of sub-pixels, the first combination value being obtained by combining values of the plurality of sub-pixels. According to an embodiment of the disclosure, the display device may calculate (or obtain), as the first combination value, a value of at least one of an average, a weighted sum, or a weighted average of values of the plurality of sub-pixels. According to an embodiment of the disclosure, the display device may calculate (or generate, determine) the first combination value, based on values of the plurality of sub-pixels, according to a random mathematical formula, calculation or a rule. According to an embodiment of the disclosure, the display device may obtain, as the first combination value, a value that is output via a model by inputting the values of the plurality of sub-pixels as input data to a pre-trained model (e.g., an artificial intelligence (AI) model).

According to an embodiment of the disclosure, the display device may map the first combination value to an output value of each of the plurality of sub-pixels. According to an embodiment of the disclosure, the display device may update, modify, change, or substitute the output value of each of the plurality of sub-pixels from an existing value to the first combination value. For example, the display device generates and output an output image that is the target image in which respective values of the plurality of sub-pixels are changed to the first combination value.

In operation 350 of FIG. 3, while the display device allocates the first combination value to an output value of all of the plurality of sub-pixels, the first combination value being obtained by combining a plurality of sub-pixel values, the disclosure is not limited thereto. For example, the display device allocates the first combination value to an output value of only some sub-pixels among the plurality of sub-pixels, the first combination value being obtained by combining the plurality of sub-pixel values. For example, for some sub-pixels among the plurality of sub-pixels, the display device maintains an existing value or may allocate a value obtained by performing additional calculation based on the first combination value.

The method 300 by which the display device corrects distortion due to a lenticular lens may be performed according to the flowchart of FIG. 3, but the disclosure is not limited thereto.

Figure 4:
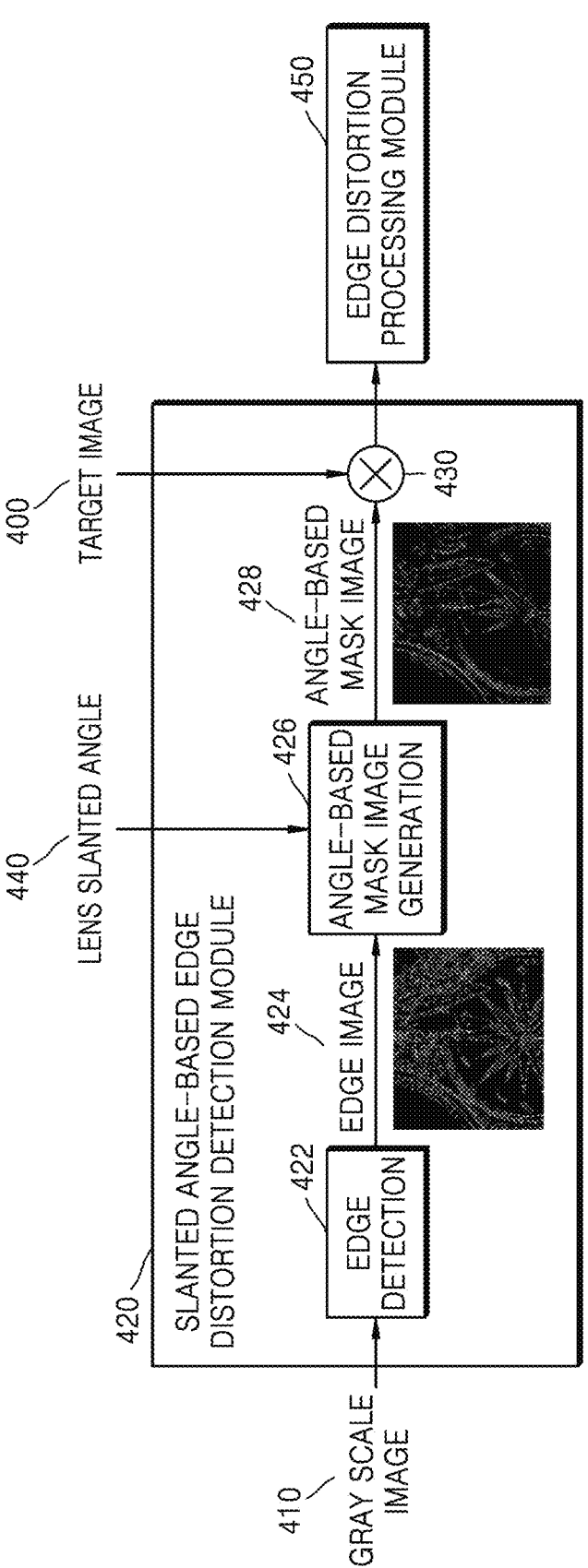
FIG. 4 is a diagram illustrating an example in which a display device detects an area of a target image in which distortion due to a lenticular lens occurs, according to an embodiment of the disclosure.

FIG. 4 is a diagram illustrating an example in which a display device detects an area of a target image in which distortion due to a lenticular lens occurs, according to an embodiment of the disclosure.

When describing FIG. 4, redundant descriptions with respect to at least one of FIGS. 1, 2A to 2E, and 3 may be skipped.

Referring to FIG. 4, an example in which the display device detects slanted angle-based edge distortion is illustrated, according to an embodiment of the disclosure.

The slanted angle-based edge distortion may include distortion occurring, due to an optical characteristic of the lenticular lens, at an edge having a slanted angle of which similarity to a slanted angle of the lenticular lens is within a preset range. Detection of the distortion may include determination as to whether an area of the distortion exists in the target image, and/or detection of an area in which distortion occurs (i.e., a distortion area) in the target image.

The display device may detect an area in which distortion occurs, based on a gray scale image 410 corresponding to a target image 400. The gray scale image 410 may include an image from which color information (e.g., color channel) of the target image 400 (e.g., color image) is removed, and which indicates only brightness information (e.g., brightness channel). For example, the gray scale image 410 includes an image in which chroma of the target image 400 is modified to 0. For example, the gray scale image 410 is generated by substituting an average value or a weighted average value of values of RGB channels (e.g., RGB sub-pixels) of each pixel with one brightness value of each pixel. For example, the gray scale image 410 is generated from the target image 400 by using a function, an algorithm, or a model for converting an image to a gray scale. The display device may identify (or, determine, select) the area in which the distortion occurs in the target image 400, from the gray scale image 410 corresponding to the target image 400.

A slanted angle-based edge distortion detection module 420 of the display device may detect (422), from the gray scale image 410, one or more edges included in the target image 400. Referring to FIG. 4, the slanted angle-based edge distortion detection module 420 may detect the one or more edges from the gray scale image 410, thereby generating an edge image 424 including the one or more edges. For example, the slanted angle-based edge distortion detection module 420 detects the one or more edges included in the target image 400, by using a random edge detection algorithm (e.g., Sobel, Canny, Roberts, Prewitt algorithms, and the like) or a random edge detection model (e.g., a trained model, a statistics model, an AI model, and the like.). For example, the slanted angle-based edge distortion detection module 420 generates (or, obtain) the edge image 424 including the one or more edges, based on data output by inputting the gray scale image 410 corresponding to the target image 400 to an edge detection algorithm (or model).

The slanted angle-based edge distortion detection module 420 may identify a preset slanted angle 440 of the lenticular lens. The slanted angle-based edge distortion detection module 420 may generate (426) an angle-based mask image 428, based on the generated edge image 424 and the slanted angle 440 of the lenticular lens. According to an embodiment of the disclosure, the slanted angle-based edge distortion detection module 420 may generate, determine, or obtain, from the generated edge image 424, the angle-based mask image 428, based on the slanted angle 440. For example, the slanted angle-based edge distortion detection module 420 identifies at least one edge of which similarity to the slanted angle 440 is within a present range from among the one or more edges included in the edge image 424. The slanted angle-based edge distortion detection module 420 may generate the angle-based mask image 428 indicating at least one area including the identified at least one edge. For example, the angle-based mask image 428 may be an image in which a value of pixels of the at least one area including the at least one edge is 1 (or, 0), and a value of other pixels is 0 (or, 1), and may have the same size as the target image 400.

The slanted angle-based edge distortion detection module 420 may identify a distortion area from the target image 400 by applying (430) the angle-based mask image 428 to the target image 400. For example, the slanted angle-based edge distortion detection module 420 applies (430) the angle-based mask image 428 to the target image 400, thereby detecting, obtaining, determining, or selecting the distortion area from the target image 400. For example, the slanted angle-based edge distortion detection module 420 performs element wise (e.g., for each pixel) multiplication calculation on the angle-based mask image 428 and the target image 400, thereby identifying or selecting, from the target image 400, the at least one area including the at least one edge of which similarity to the slanted angle 440 is within the present range.

The slanted angle-based edge distortion detection module 420 may provide or transmit a result of the detection to an edge distortion processing module 450. According to an embodiment of the disclosure, the slanted angle-based edge distortion detection module 420 may provide the edge distortion processing module 450 with information about the at least one area of the target image 400 which includes the at least one edge of which similarity to the slanted angle 440 is within the present range. The edge distortion processing module 450 may perform processing to correct distortion of the distortion area, based on the result of the detection provided (or received) from the slanted angle-based edge distortion detection module 420. A detailed operation of the edge distortion processing module 450 may be described below with reference to FIGS. 5A to 5D.

FIGS. 5A, 5B, 5C, and 5D are diagrams illustrating an example in which a display device corrects distortion of an area in which the distortion due to a lenticular lens occurs, according to one or more embodiments of the disclosure.

When describing FIGS. 5A to 5D, redundant descriptions with respect to at least one of FIGS. 1, 2A to 2E, 3, and 4 may be skipped.

Figure 5A:
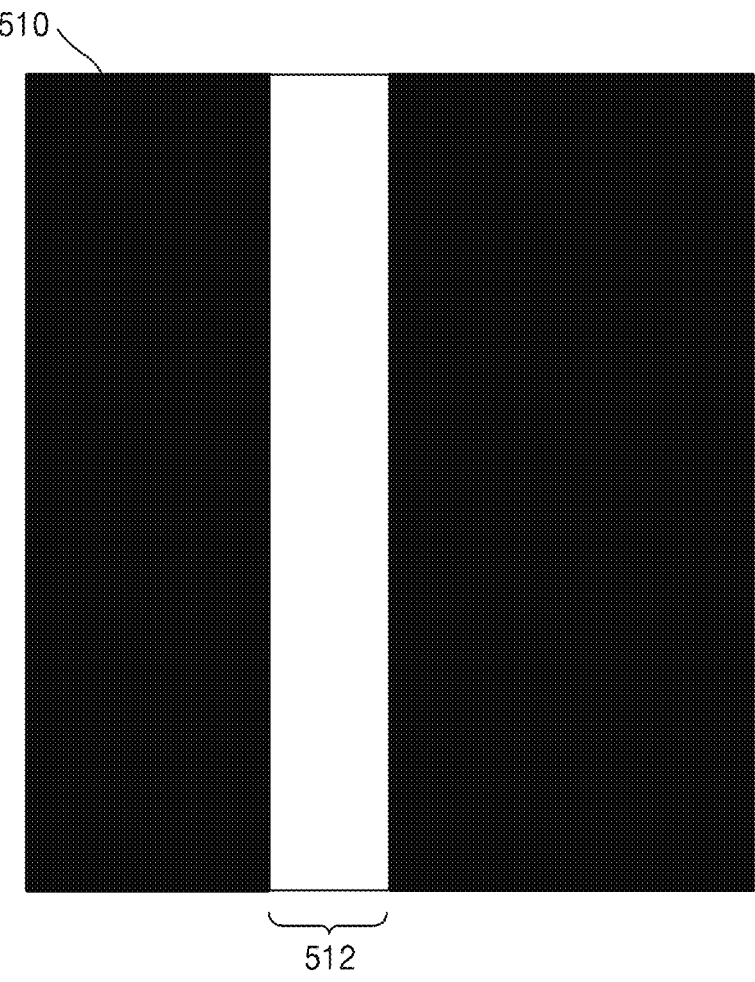
FIGS. 5A, 5B, 5C, and 5D are diagrams illustrating an example in which a display device corrects distortion of an area in which the distortion due to a lenticular lens occurs, according to one or more embodiments of the disclosure.

FIG. 5A may show an angle-based mask image 510 of the target image 210 of FIG. 2A according to an embodiment of the disclosure.

Figure 5B:
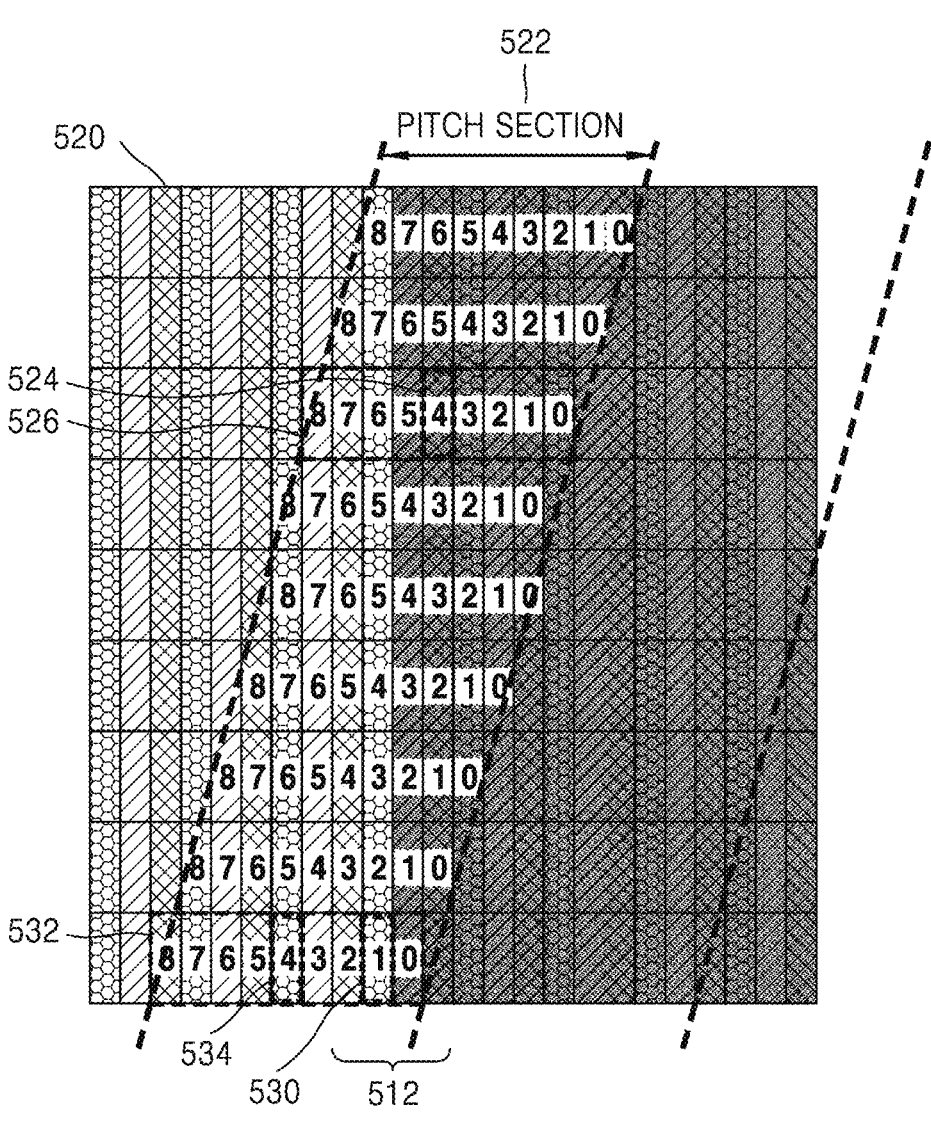

FIG. 5B may show a target image 520 output on a display including a plurality of sub-pixel modules according to an embodiment of the disclosure.

Referring to FIGS. 5A and 5B, the angle-based mask image 510 may include 1 as a value of an area 512 of the target image 210 which includes an edge of which similarity to a slanted angle of a lenticular lens is within a preset range, and 0 as a value of other areas. The display device (e.g., the slanted angle-based edge distortion detection module 420) may apply the angle-based mask image 510 to the target image 520, and thus, may identify the area (hereinafter, the distortion area) 512 of the target image 520 which includes the edge of which similarity to the slanted angle of the lenticular lens is within the preset range. Operations of the display device to be described below may be performed by the edge distortion processing module 450 included in the display device.

The display device (e.g., the edge distortion processing module 450) may identify sub-pixels included in the distortion area 512. According to an embodiment of the disclosure, for each of the identified sub-pixels, the display device may select, as sub-pixels to be combined, a plurality of sub-pixels positioned in the same row as each of the identified sub-pixels. According to an embodiment of the disclosure, for each of the identified sub-pixels, the display device may select, as sub-pixels to be combined, a plurality of sub-pixels within a pitch section including each of the identified sub-pixels from among a plurality of pitch sections of the lenticular lens.

Referring to FIG. 5B, the display device (e.g., the edge distortion processing module 450) may select a plurality of sub-pixels 526 of the same row as a first sub-pixel 524 included in the distortion area 512. For example, the display device selects the plurality of sub-pixels 526 of the same row as the first sub-pixel 524 within one pitch section 522 including the first sub-pixel 524. For example, when at least a preset area of a sub-pixel is included in the pitch section 522, the sub-pixel is identified to be included in the pitch section 522. Referring to FIG. 5B, the display device selects all sub-pixels that are positioned in the same row as the first sub-pixel 524 and are included in the pitch section 522 of the lenticular lens, as a sub-pixel (e.g., a combination target sub-pixel) to be combined, but the disclosure is not limited thereto. For example, the display device selects only some sub-pixels that are included in the pitch section 522 and are positioned in the same row as the first sub-pixel 524, as a sub-pixel to be combined.

The display device may calculate, determine, generate, or obtain an output value of each of the plurality of sub-pixels 526, based on values of the plurality of sub-pixels 526. According to an embodiment of the disclosure, the display device may obtain a first combination value by combining the values of the plurality of sub-pixels 526. For example, the display device may calculate, as the first combination value, a value of at least one of an average, a weighted sum, or a weighted average, which are of the plurality of sub-pixels 526.

According to an embodiment of the disclosure, the display device may allocate the first combination value to an output value of the first sub-pixel 524. According to an embodiment of the disclosure, the display device may allocate the first combination value to an output value for the plurality of sub-pixels 526. For example, the display device allocates the same output value, for each row, to sub-pixels included in the pitch section 522. According to an embodiment of the disclosure, the display device may allocate the first combination value to an output value for only some sub-pixels from among the plurality of sub-pixels 526.

The display device may perform operations on other sub-pixels (e.g., a second sub-pixel 530) included in the distortion area 512, the operations being performed on the first sub-pixel 524. For example, the display device selects a plurality of sub-pixels 532 of the same row as the second sub-pixel 530 in the pitch section 522 including the second sub-pixel 530. The display device may allocate a second combination value to an output value of the second sub-pixel 530 and/or a third sub-pixel 534 included in the plurality of sub-pixels 532, the second combination value being obtained by combining values of the plurality of sub-pixels 532.

FIGS. 5A to 5D show an example in which the display device allocates a combination value to an output value only for a sub-pixel that is based (e.g., used) in calculation of the combination value, but the disclosure is not limited thereto. For example, the display device may allocate the combination value to an output value of a sub-pixel that is not based in calculation of the combination value. For example, the display device allocates a combination value calculated based on values of sub-pixels excluding the third sub-pixel 534 from among the plurality of sub-pixels 532, to an output value of the third sub-pixel 534.

Figure 5C:
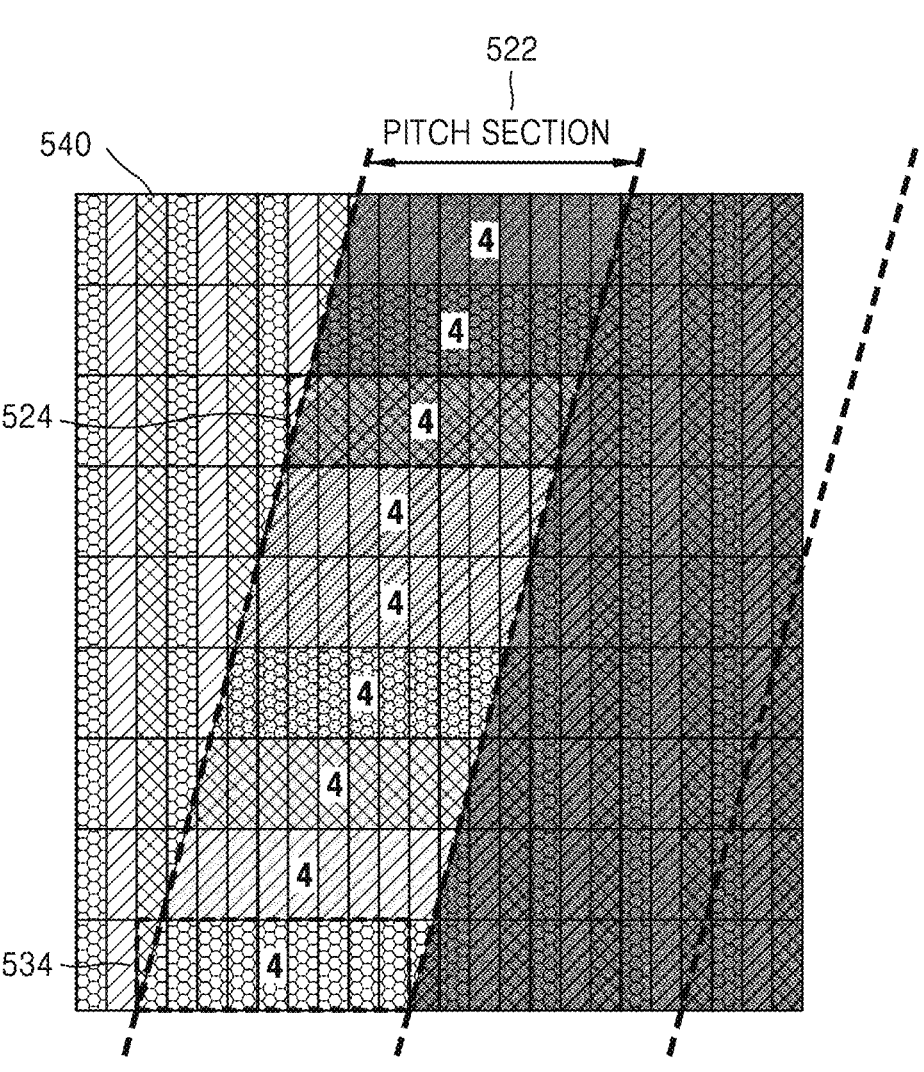
Figure 5D:
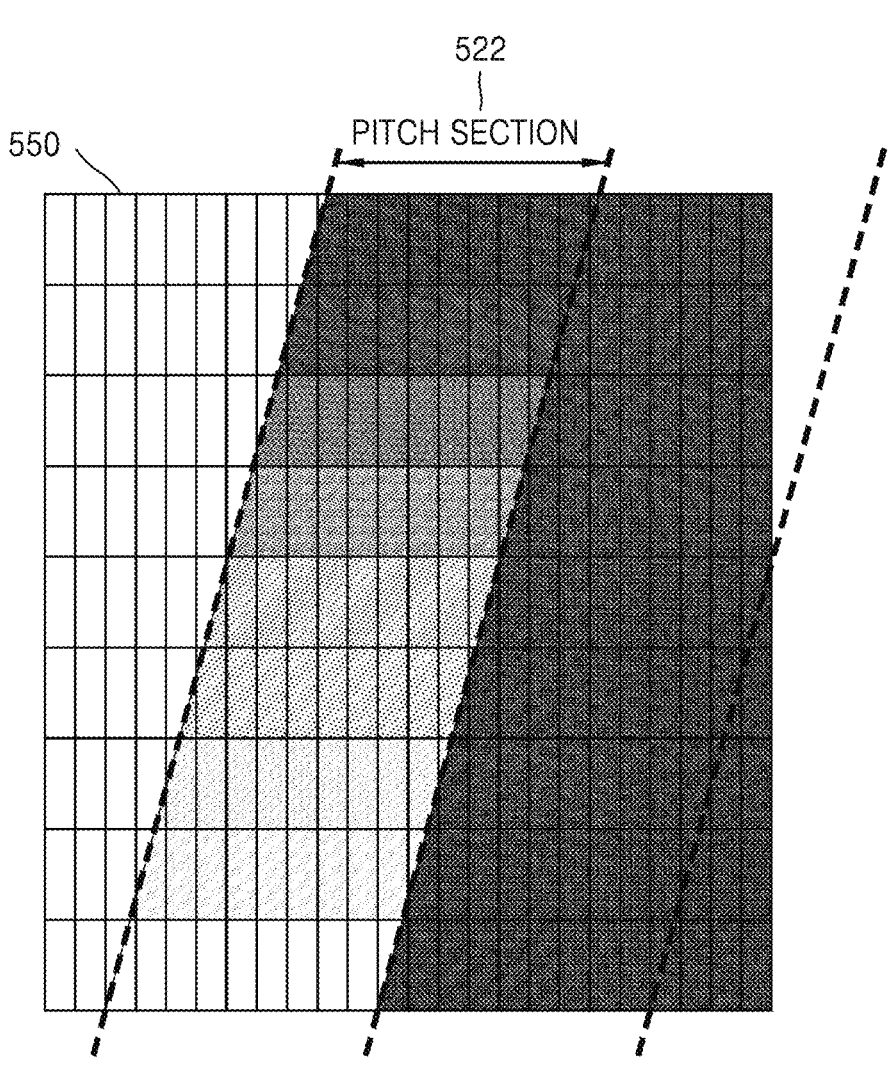

FIGS. 5C and 5D illustrate view images 540 and 550 viewed at a fourth view position when a display device outputs a target image in which distortion has been corrected according to one or more embodiments of the disclosure.

Referring to FIGS. 5C and 5D, the view image 540 of FIG. 5C may show an image in which color components are separate in units of sub-pixels, and the view image 550 of FIG. 5D may show an image in which color components are combined and which is actually viewed (or recognized) to a viewer.

Before distortion correction, the first sub-pixel 524 was included in a black area, and thus, an output value of the first sub-pixel 524 was a low value (e.g. 0). After the display device performs distortion correction processing, the first combination value may be allocated to the output value of the first sub-pixel 524. Before distortion correction, the third sub-pixel 534 was included in a white area, and thus, an output value of the third sub-pixel 534 was a high value (e.g., a maximum value). After the display device performs distortion correction processing, a second combination value may be allocated to an output value of the third sub-pixel 534. For example, as the display device performs distortion correction processing, the output value of the first sub-pixel 524 is increased, compared to an original value, and the output value of the third sub-pixel 534 is decreased, compared to an original value.

Referring to the view image 540 of FIG. 5C, at a fourth view point, the first sub-pixel 524 may be zoomed in at a third row in a pitch section and viewed, and the third sub-pixel 534 may be zoomed in at a ninth row in the pitch section and viewed. With respect to a plurality of rows within the pitch section 522 in the target image 520 of FIG. 5B, as a ratio of sub-pixels included in a white area is increased from the top to the bottom, a combination value (e.g., an average value) for each row may be increased from the top to the bottom. By distortion correction processing, a combination value for each row may be allocated to an output value of a plurality of pixels of each row, and in this case, unlike the view image 240 of FIG. 2B, the view image 540 in which sub-pixels of each row gradually become bright from the top to the bottom may be provided.

Referring to FIG. 5D, with respect to an area of the view image 250 of FIG. 2B in which the disconnection phenomenon and the step phenomenon are apparent, the display device performs distortion correction processing and thus outputs values that gradually become bright from the top to the bottom (i.e., in a gradation manner), so that the view image 550 in which the disconnection phenomenon and the step phenomenon are improved and alleviated may be provided to a viewer.

Figure 6A:
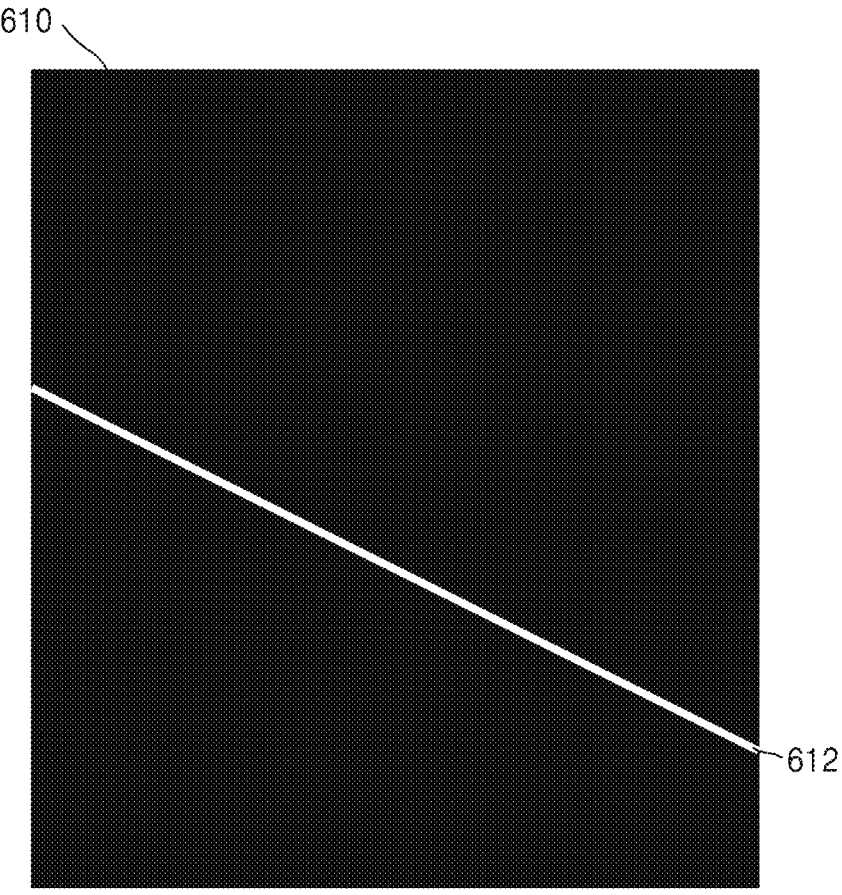
FIGS. 6A, 6B, and 6C are diagrams illustrating an example of distortion due to a lenticular lens according to one or more embodiments of the disclosure.
Figure 6B:
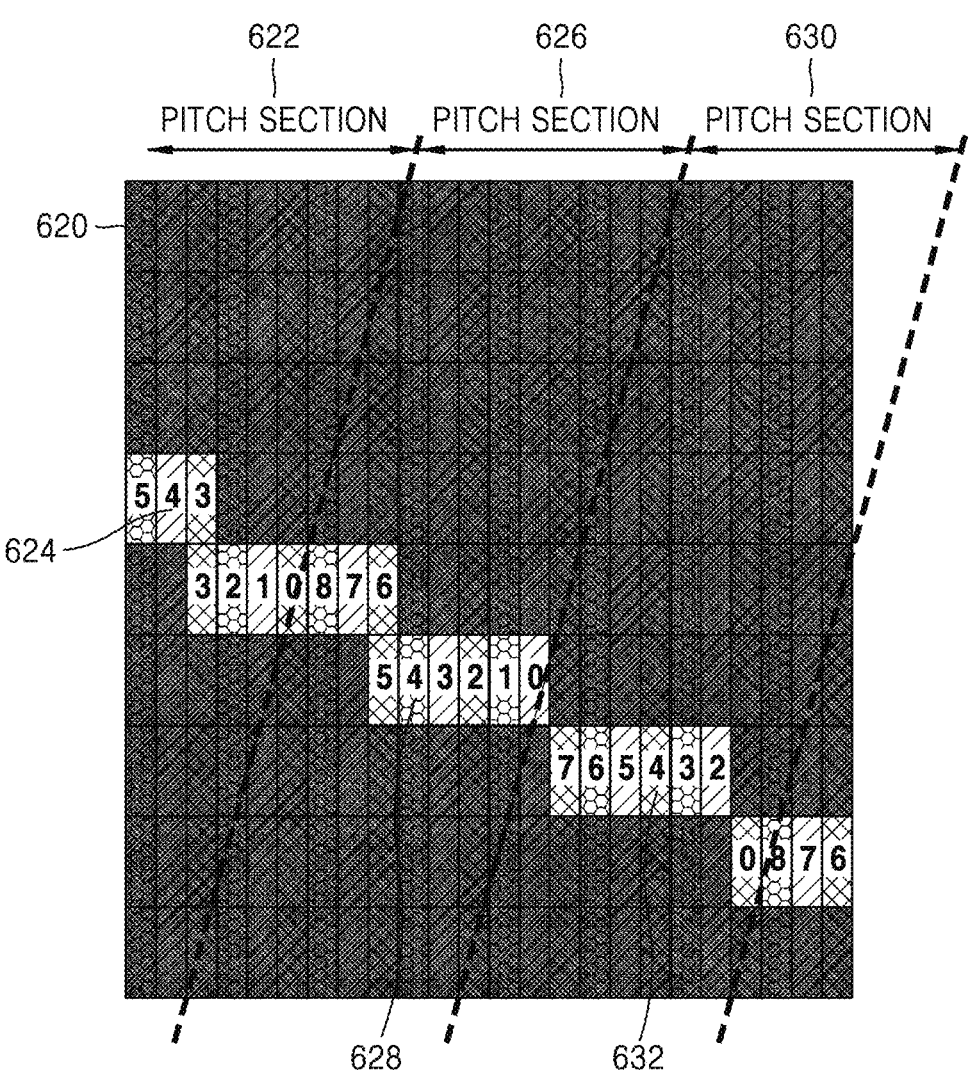
Figure 6C:
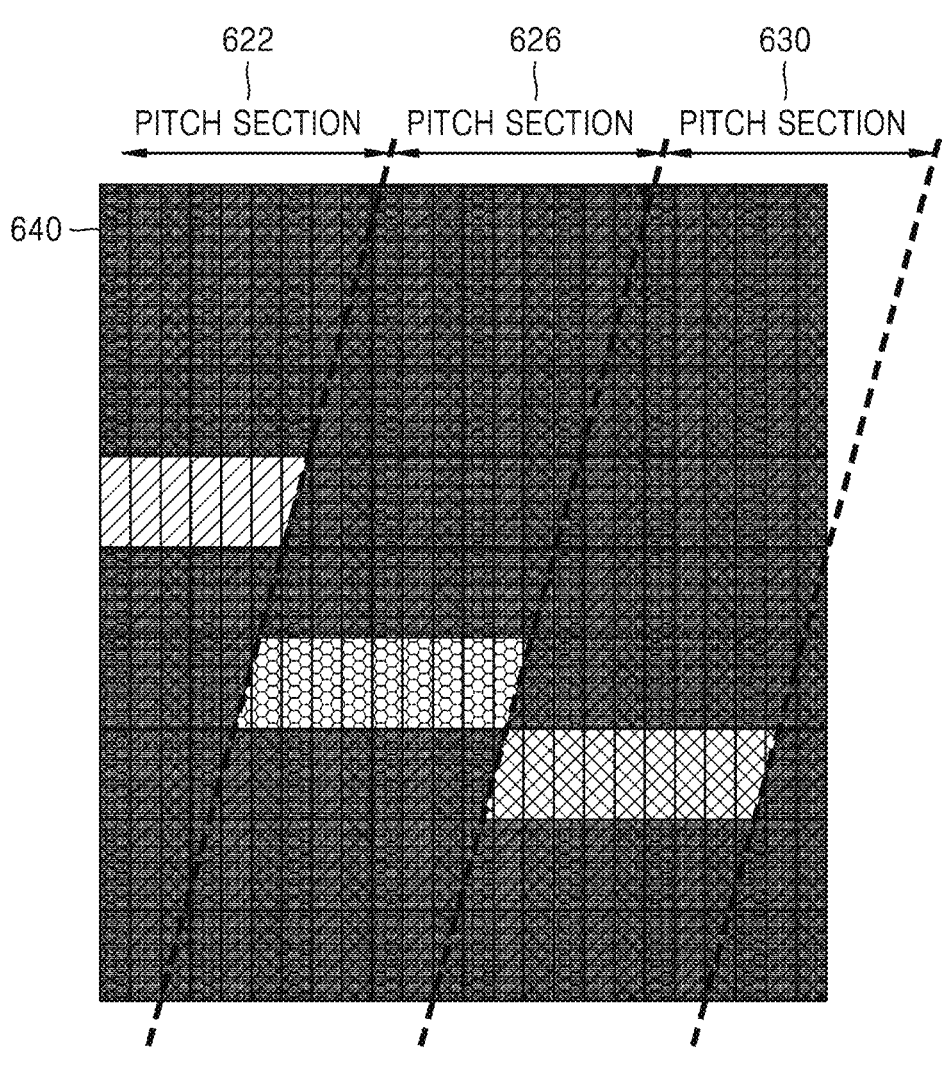

FIGS. 6A, 6B, and 6C are diagrams illustrating an example of distortion due to a lenticular lens according to one or more embodiments of the disclosure.

When describing FIGS. 6A to 6C, redundant descriptions with respect to at least one of FIGS. 1, 2, 3A to 3E, 4, and 5A to 5D may be skipped.

FIG. 6A may show a target image 610 including a slim white line 612 and a black area according to an embodiment of the disclosure.

In the target image 610 of FIG. 6A, a plurality of sub-pixels included in the slim white line 612 may have a high brightness value (e.g., a maximum value), and a plurality of sub-pixels included in the black area may have a low brightness value (e.g., 0).

The display device may output the target image 610 on a display. FIG. 6B may show a target image 620 output on the display including a plurality of sub-pixel modules. FIG. 6B may show the target image 620 in which color components are separate in units of sub-pixels.

On the display, sub-pixel modules corresponding to the slim white line 612 may output light according to an output value of the plurality of sub-pixels included in the slim white line 612. Referring to FIG. 6B, the sub-pixel modules corresponding to the slim white line 612 may output light with high brightness or bright light (e.g., light with maximum brightness) according to a high output value of the plurality of sub-pixels included in the slim white line 612. On the display, sub-pixel modules corresponding to the black area of the target image 610 may output light according to an output value of a plurality of sub-pixels included in the black area. Referring to FIG. 6B, the sub-pixel modules corresponding to the black area may output light with low brightness or dim light according to a low output value of the plurality of sub-pixels included in the black area, or may not output light.

Referring to FIG. 6B, numbers marked at the sub-pixels included in the slim white line 612 may indicate identification numbers of view positions at which respective sub-pixels are viewed. For example, when a viewer views, via the lenticular lens, a target image 20 output on the display, at a fourth view position, only sub-pixels marked with 4 viewed to a viewpoints of the viewer from among the plurality of sub-pixels included in the slim white line 612. In FIG. 6B, identification numbers of view positions for sub-pixels other than the slim white line 612 may be skipped.

FIG. 6C may show a view image 640 of a case in which the target image 620 output on the display is viewed at the fourth view position according to an embodiment of the disclosure.

The view image 640 of FIG. 6C may be an image in which color components are separate in units of sub-pixels. Referring to FIGS. 6B and 6C, only a first sub-pixel 624 from among the plurality of sub-pixels included in the slim white line 612 may be zoomed in by a first pitch section 622 and viewed in the first pitch section 622, only a second sub-pixel 628 may be zoomed in by a second pitch section 626 and viewed in the second pitch section 626, and only a third sub-pixel 632 may be zoomed in by a third pitch section 630 and viewed in the third pitch section 630.

The target image 620 output on the display is viewed with R sub-pixels, G sub-pixels, and B sub-pixels constituting a white line and being combined, when without an influence from the lenticular lens, and thus, may be recognized as the white line to a viewer as the target image 610 of FIG. 6A.

However, due to the lenticular lens, only some sub-pixels from among the sub-pixels constituting the white line are zoomed in in the lenticular lens and viewed, the sub-pixels that are zoomed in in the lenticular lens may be viewed without being combined with other color components, i.e., with being separate (or apparent).

For example, referring to FIG. 6C, a Green color is viewed in the first pitch section 622, a Red color is viewed in the second pitch section 626, and a Blue color is viewed in the third pitch section 630, and as the Green, Red, and Blue colors are zoomed in and viewed, compared to a size of sub-pixels originally constituting an image, the view image 640 is viewed with RGB color components being separate. Therefore, a RGB color separation phenomenon in which a slim white line is divided into R color sections, G color sections, and B color sections and shown may occur.

Figure 7:
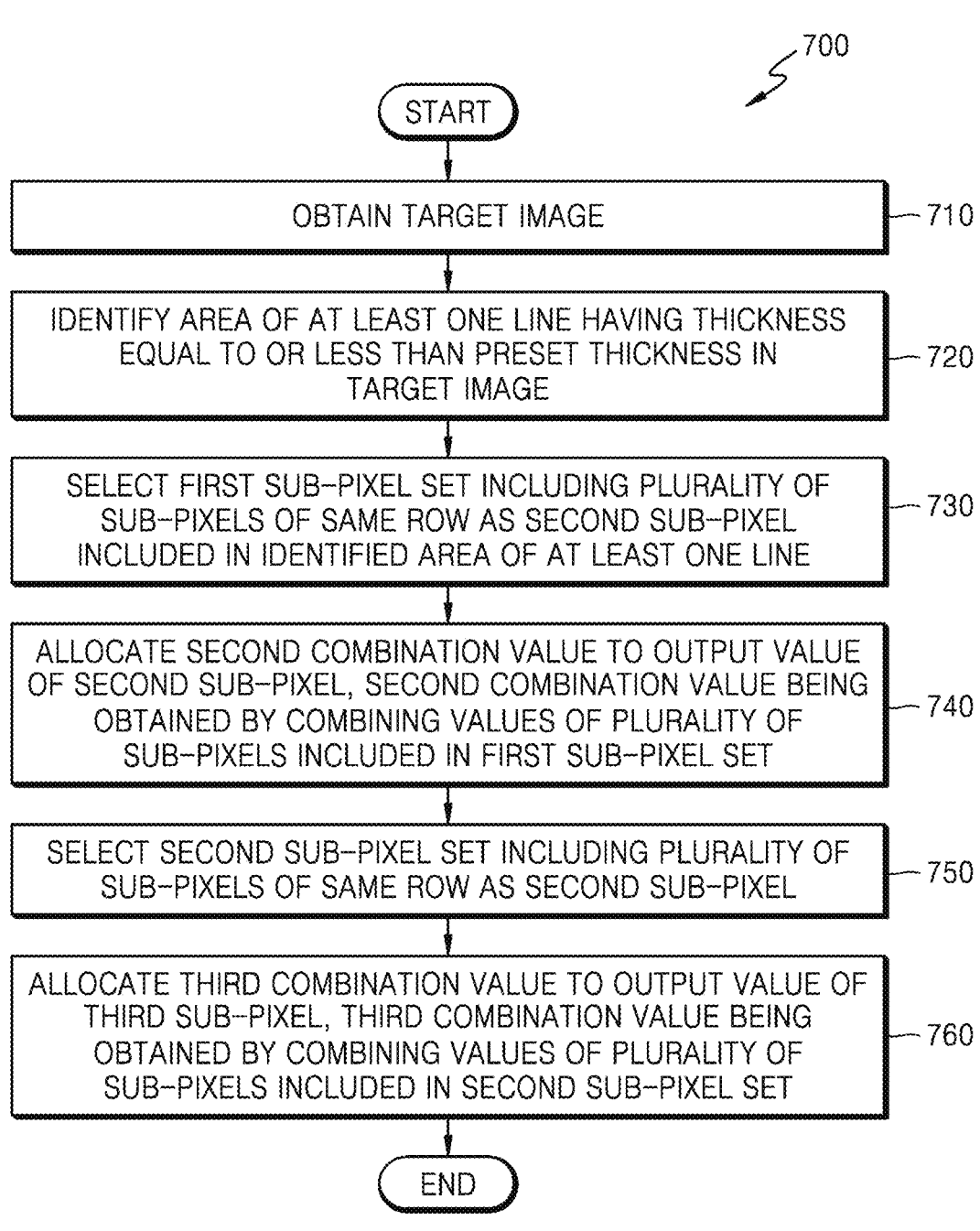
FIG. 7 is a flowchart of an example of a method by which a display device corrects distortion due to a lenticular lens, according to an embodiment of the disclosure.

FIG. 7 is a flowchart of an example of a method by which a display device corrects distortion due to a lenticular lens, according to an embodiment of the disclosure.

Referring to FIG. 7, a method 700 by which the display device according to an embodiment of the disclosure corrects distortion due to a lenticular lens may include operations 710 to 760. According to an embodiment of the disclosure, operations 710 to 760 may be executed by at least one processor included in the display device. The method 700 by which the display device corrects distortion due to a lenticular lens is not limited to what is shown in FIG. 7, and in one or more embodiments, the method 700 may further include operations not shown in FIG. 7 or may not include some operations.

In operation 710, the display device may obtain a target image. According to an embodiment of the disclosure, the display device may receive the target image from an external device. According to an embodiment of the disclosure, the display device may generate the target image by performing random processing on an input image received from the external device. According to an embodiment of the disclosure, the display device may generate the target image, based on an image signal input via an image input module (e.g., a camera module) included in the display device.

In order to correct distortion due to the lenticular lens, the display device may identify, select, detect, or determine an area of the target image in which distortion occurs. For example, the display device detects the area of distortion in the target image by using predefined random rule, an algorithm, or a model.

According to an embodiment of the disclosure, in operation 720, the display device may identify an area of at least one line having a thickness equal to or less than a preset thickness in a target image. According to an embodiment of the disclosure, the display device may generate, from a gray scale image corresponding to the target image, a second mask image indicating the area of the at least one line having a thickness equal to or less than a preset thickness. The display device may apply the generated second mask image to the target image, thereby identifying an area of at least one line having a thickness (or width) equal to or less than a preset thickness (or a preset width) in the target image.

According to an embodiment of the disclosure, the display device may perform thresholding calculation to enhance brightness contrast and remove an area having a value less than a reference in the gray scale image, and thus, may obtain (or generate) a first image indicating a white area of the target image. The display device may perform a predefined morphological operation on the first image, and thus, may obtain (or generate) a second image from which an area of a line having a thickness equal to or less than a preset thickness is removed from the white area of the target image. The display device may perform calculation to subtract the second image from the first image, and thus, may obtain (or generate) the second mask image. According to an embodiment of the disclosure, the display device may perform calculation to subtract the first mask image indicating a slanted angle-based edge distortion area and the second image from a first image, and thus, may generate (or obtain) the second mask image. For example, the first mask image indicates at least one area including at least one edge having a slanted angle of which similarity to a slanted angle of the lenticular lens is within a preset range.

In the disclosure, the morphological operation may include an operation of modifying and deforming an image, based on a form and structure, in image processing. The morphological operation may include a dilation operation, an erosion operation, or a combination thereof. For example, the morphological operation includes an operation of repeatedly performing the dilation operation and the erosion operation. The dilation operation may include an operation expanding a boundary of an object. The erosion operation may include an operation of decreasing a boundary of the object. According to an embodiment of the disclosure, the predefined morphological operation may include an operation in which a structure and parameter values of the operation are set according to a purpose. For example, the predefined morphological operation includes an operation in which a configuration, a structure, and parameter values of the operation are set to remove a line having a thickness equal to or less than a preset thickness in an image on which the operation is performed.

In order to correct distortion due to the lenticular lens, the display device may perform processing of combining values of a plurality of sub-pixels on an area related to the distortion. According to an embodiment of the disclosure, the display device may select, set, identify, or determine a plurality of sub-pixels to be combined to correct distortion, from among sub-pixels included in the target image. For example, the display device selects the plurality of sub-pixels to be combined to correct distortion, from among the sub-pixels included in the target image, by using a predefined random rule, an algorithm, or a model. For example, the display device selects a plurality of sub-pixels to be combined, based on different rules, algorithms, or models, according to types of distortion.

According to an embodiment of the disclosure, in operation 730, the display device may select a first sub-pixel set including a plurality of sub-pixels of the same row as a second sub-pixel included in the area of the at least one line identified in operation 720. For example, the sub-pixels of the same row as the second sub-pixel includes a sub-pixel positioned in the same row as the second sub-pixel, a sub-pixel included in the same row as the second sub-pixel, and a sub-pixel positioned in a vertical direction (or a perpendicular direction) with respect to the second sub-pixel. According to an embodiment of the disclosure, the display device may select the first sub-pixel set in a pitch section including the second sub-pixel from among a plurality of pitch sections of the lenticular lens. For example, a sub-pixel included in the first sub-pixel set is included in the same row and the same pitch section as the second sub-pixel.

The number of sub-pixels included in the first sub-pixel set may be smaller than the number of sub-pixels included in the same row and the same pitch section as the second sub-pixel, but the disclosure is not limited thereto. For example, the number of sub-pixels included in the same row and the same pitch section as the second sub-pixel may be 20, and the number of sub-pixels included in the first sub-pixel set may be 6.

According to an embodiment of the disclosure, the display device may select the first sub-pixel set including a plurality of sub-pixels positioned in a perpendicular direction (or a vertical direction) with respect to the second sub-pixel. For example, the display device selects the first sub-pixel set including the plurality of sub-pixels sequentially arranged in a perpendicular direction with respect to the second sub-pixel. For example, the display device selects the first sub-pixel set including a preset number (e.g., 2) of sub-pixels above the second sub-pixel, a preset number (e.g., 3) of sub-pixels below the second sub-pixel, and/or the second sub-pixel.

In operation 740, the display device may allocate a second combination value to an output value of the second sub-pixel, the second combination value being obtained by combining values of the plurality of sub-pixels included in the first sub-pixel set. According to an embodiment of the disclosure, the display device may determine, as the second combination value, a value of at least one of an average, a weighted sum, or a weighted average, which are of the plurality of sub-pixels included in the first sub-pixel set.

In operation 750, the display device may select a second sub-pixel set including a plurality of sub-pixels of the same row as the second sub-pixel. According to an embodiment of the disclosure, the display device may select the second sub-pixel set within a pitch section including the second sub-pixel. For example, a sub-pixel included in the second sub-pixel set is included in the same row and the same pitch section as the second sub-pixel.

According to an embodiment of the disclosure, the display device may select the second sub-pixel set, in relation to a third sub-pixel positioned in the same row (and/or the same pitch section) as the second sub-pixel. For example, the display device may select the second sub-pixel set including a plurality of sub-pixels positioned in a perpendicular direction (or a vertical direction) with respect to the third sub-pixel. For example, the display device selects the second sub-pixel set including the plurality of sub-pixels sequentially arranged in a perpendicular direction with respect to the third sub-pixel. For example, the display device may select the second sub-pixel set including a preset number (e.g., 2) of sub-pixels above the third sub-pixel, a preset number (e.g., 3) of sub-pixels below the third sub-pixel, and/or the third sub-pixel.

In operation 760, the display device may allocate a third combination value to an output value of the third sub-pixel, the third combination value being obtained by combining values of the plurality of sub-pixels included in the second sub-pixel set. For example, the third sub-pixel is a pixel immediately above or below the second sub-pixel, but the disclosure is not limited thereto. According to an embodiment of the disclosure, the display device may determine, as the third combination value, a value of at least one of an average, a weighted sum, or a weighted average, which are of the plurality of sub-pixels included in the second sub-pixel set.

According to an embodiment of the disclosure, the first sub-pixel set may be different from the second sub-pixel set. For example, the first sub-pixel set selected based on the second sub-pixel is different from the second sub-pixel set selected based on the third sub-pixel. For example, the plurality of sub-pixels included in the first sub-pixel set is completely different or partly different from the plurality of sub-pixels included in the second sub-pixel set. For example, there is a sub-pixel existing only one set among the first sub-pixel set and the second sub-pixel set. According to an embodiment of the disclosure, the first sub-pixel set and the second sub-pixel set may be equal to each other.

According to an embodiment of the disclosure, the display device may not allocate a combination value to at least one sub-pixel from among sub-pixels (e.g., sub-pixels to be combined) that are based in obtaining the combination value. For example, at least one sub-pixel from among sub-pixels that are included in a plurality of first sub-pixel sets or a plurality of second sub-pixel sets and are based in obtaining the first combination value or the second combination value is not allocated the combination value and may maintain its original value. In this case, the display device may output a target image with the original value for the at least one sub-pixel that is not allocated the combination value.

The second combination value obtained in operation 740 and the third combination value obtained in operation 760 may be different from each other, but the disclosure is not limited thereto. According to an embodiment of the disclosure, as the first sub-pixel set and the second sub-pixel set are different from each other, the second combination value and the third combination value may be different from each other. According to an embodiment of the disclosure, as a mathematical formula, a model, a rule, an algorithm, or calculation the display device use to combine sub-pixels in operation 740 are different from a mathematical formula, a model, a rule, an algorithm, or calculation used to combine sub-pixels in operation 760, the second combination value and the third combination value may be different from each other. For example, the second combination value is an average value of values of the plurality of sub-pixels included in the first sub-pixel set, whereas the third combination value may be a weighted sum value of values of the plurality of sub-pixels included in the second sub-pixel set.

The method 700 by which the display device corrects distortion due to a lenticular lens may be performed according to the flowchart of FIG. 7, but the disclosure is not limited thereto. FIG. 7 illustrates an example in which the display device selects the first sub-pixel set, allocates the second combination value to the output value of the second sub-pixel, selects the second sub-pixel set, and allocates the third combination value to the output value of the third sub-pixel, but the disclosure is not limited thereto. For example, the display device performs in parallel an operation of selecting the first sub-pixel set and allocating the second combination value to the output value of the second sub-pixel (i.e., operations 730 and 740) and an operation of selecting the second sub-pixel set and allocating the third combination value to the output value of the third sub-pixel (i.e., operations 750 and 760). For example, the display device performs an operation of selecting the first sub-pixel set and the second sub-pixel set (i.e., operations 730 and 750), and then an operation of allocating the second combination value to the output value of the second sub-pixel and allocating the third combination value to the output value of the third sub-pixel (i.e., operations 740 and 760).

Figure 8:
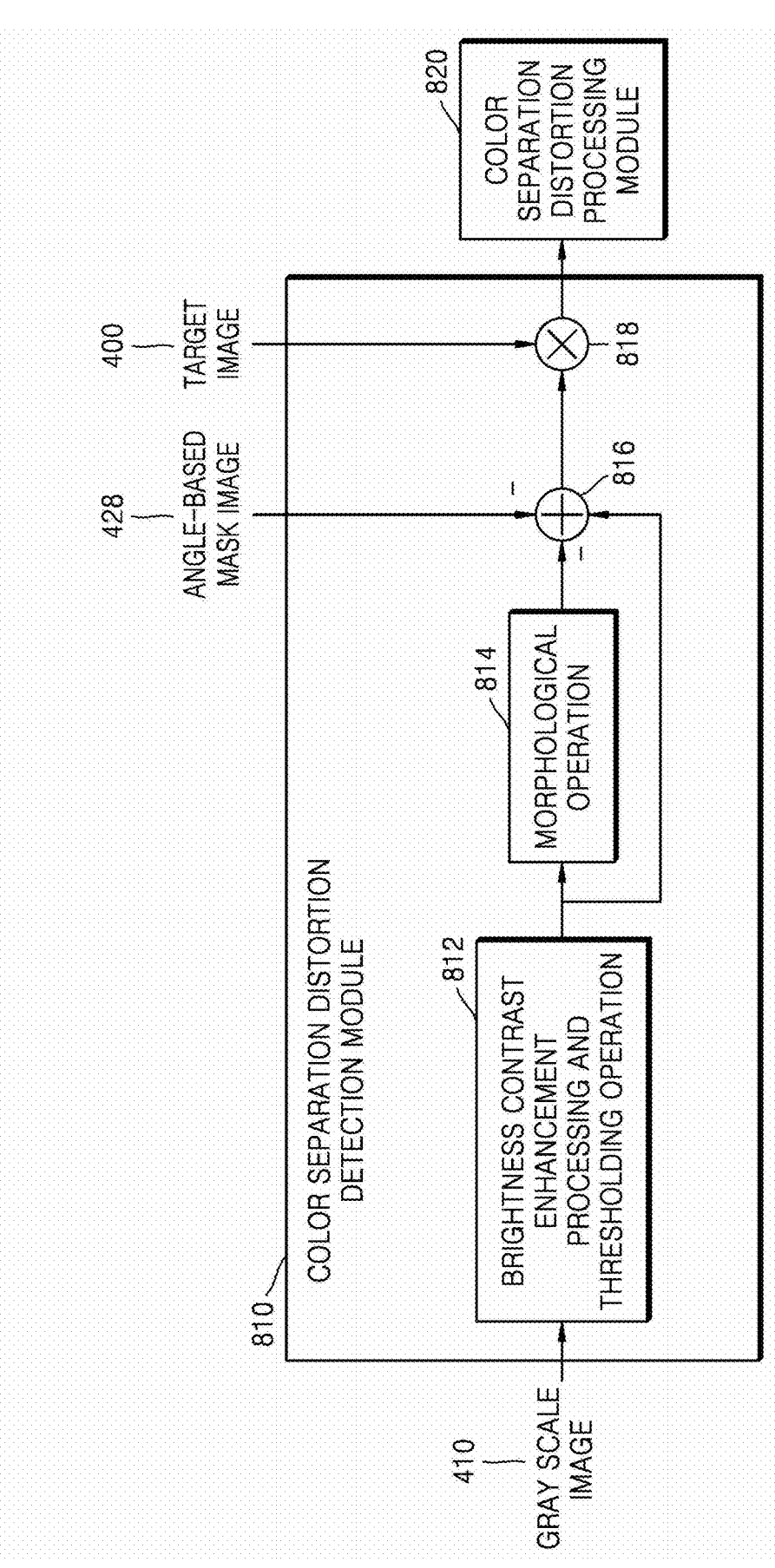
FIG. 8 is a diagram illustrating an example in which a display device detects an area of a target image in which distortion due to a lenticular lens occurs, according to an embodiment of the disclosure.

FIG. 8 is a diagram illustrating an example in which a display device detects an area of a target image in which distortion due to a lenticular lens occurs, according to an embodiment of the disclosure.

When describing FIG. 8, redundant descriptions with respect to at least one of FIGS. 1, 2A to 2E, 3, 4, 5A to 5D, 6A to 6C, and 7 may be skipped.

Referring to FIG. 8, an example in which the display device detects color separation distortion is illustrated, according to an embodiment of the disclosure. The color separation distortion may include distortion in which RGB color components are separate in an area of a slim white line, due to an optical characteristic of the lenticular lens. The slim white line is a line having a thickness of a preset thickness or less, and may include the line configured of RGB sub-pixels (or RGB color components) having a value (or brightness) equal to or greater than a preset value (or brightness).

The display device may detect an area in which distortion occurs, based on the gray scale image 410 corresponding to the target image 400. A color separation distortion detection module 810 of the display device may perform a brightness contrast enhancement processing and thresholding operation 812 on the gray scale image 410, thereby obtaining a first image. According to an embodiment of the disclosure, the color separation distortion detection module 810 may enhance brightness contrast in the gray scale image 410. For example, the color separation distortion detection module 810 may enhance brightness contrast in the gray scale image 410 so as to process a bright area to have a higher value and a dim area to have a lower value. For example, the color separation distortion detection module 810 may emphasize a bright area of the target image 400 by enhancing brightness contrast in the gray scale image 410.

According to an embodiment of the disclosure, the color separation distortion detection module 810 may remove an area having a value equal to or less than a reference from the gray scale image 410 in which brightness contrast has been enhanced, and thus, may generate the first image in which only a white area remains from the target image 400. For example, the color separation distortion detection module 810 may generate the first image including only data of pixels having a value equal to or greater than a reference (e.g., 0.8) in the gray scale image in which brightness contrast has been enhanced. For example, the color separation distortion detection module 810 may generate the first image by allocating 0 to pixels having a value less than the reference. For example, the first image may include a value of enhanced brightness contrast, as the data of the pixels having a value equal to or greater than the reference. For example, the first image may include a value in the gray scale image 410, as the data of the pixels having a value equal to or greater than the reference. For example, the first image may be an image in which 1 is allocated to the pixels having a value equal to or greater than the reference.

According to an embodiment of the disclosure, the color separation distortion detection module 810 may perform a predefined morphological operation 814 on the first image, and thus, may obtain a second image in which an area of a line having a thickness equal to or less than a preset thickness is removed from the first image including a white area of a target image. The predefined morphological operation the color separation distortion detection module 810 performs may include an operation in which a configuration, a structure, and parameter values of the operation are set to remove a line having a thickness equal to or less than a preset thickness in an image on which the operation is performed.

The color separation distortion detection module 810 may perform calculation 816 to subtract the second image from the first image, and thus, may generate (or obtain) a mask image. According to an embodiment of the disclosure, the color separation distortion detection module 810 may perform calculation 816 to subtract the second image and the angle-based mask image 428 from the first image, and thus, may generate (or obtain) a mask image. For example, the color separation distortion detection module 810 performs calculation to subtract the angle-based mask image 428 from the first image, and thus, may generate a mask image from which a line having a slanted angle of which similarity to a slanted angle of the lenticular lens is within a preset range is removed from among white lines having a small thickness included in the target image 400.

The color separation distortion detection module 810 may apply 818 the generated mask image to the target image 400, and thus, may detect an area of at least one line having a thickness equal to or less than a preset thickness in the target image 400. The area of at least one line which is detected by applying 818 the mask image to the target image 400 may be an area of a white line.

The color separation distortion detection module 810 may provide or transmit a result of the detection to a color separation distortion processing module 820. According to an embodiment of the disclosure, the color separation distortion detection module 810 may provide the color separation distortion processing module 820 with information about the area of at least one line having a thickness equal to or less than a preset thickness in the target image 400. The color separation distortion processing module 820 may perform processing to correct distortion in a distortion area, based on the result of the detection provided (or received) from the color separation distortion detection module 810. A detailed operation of the color separation distortion processing module 820 may be described below with reference to FIGS. 9A to 9D.

Referring to FIG. 8, the area of the line having the slanted angle of which similarity to the slanted angle of the lenticular lens is within the preset range from among white lines having a small thickness included in the target image 400 may not be processed by the color separation distortion processing module 820 but may be processed by the edge distortion processing module 450, but the disclosure is not limited thereto. According to an embodiment of the disclosure, an area of a slim white line from among lines having a slanted angle of which similarity to a slanted angle of the lenticular lens is within a preset range may not be processed by the edge distortion processing module 450 but may be processed by the color separation distortion processing module 820. For example, when generating a mask image, the color separation distortion detection module 810 does not use the angle-based mask image 428. For example, the slanted angle-based edge distortion detection module 420 applies, to the target image 400, a mask image in which the area of the slim white line is removed from the angle-based mask image 428, and thus, may detect a distortion area excluding the area of the slim white line.

Figure 9A:
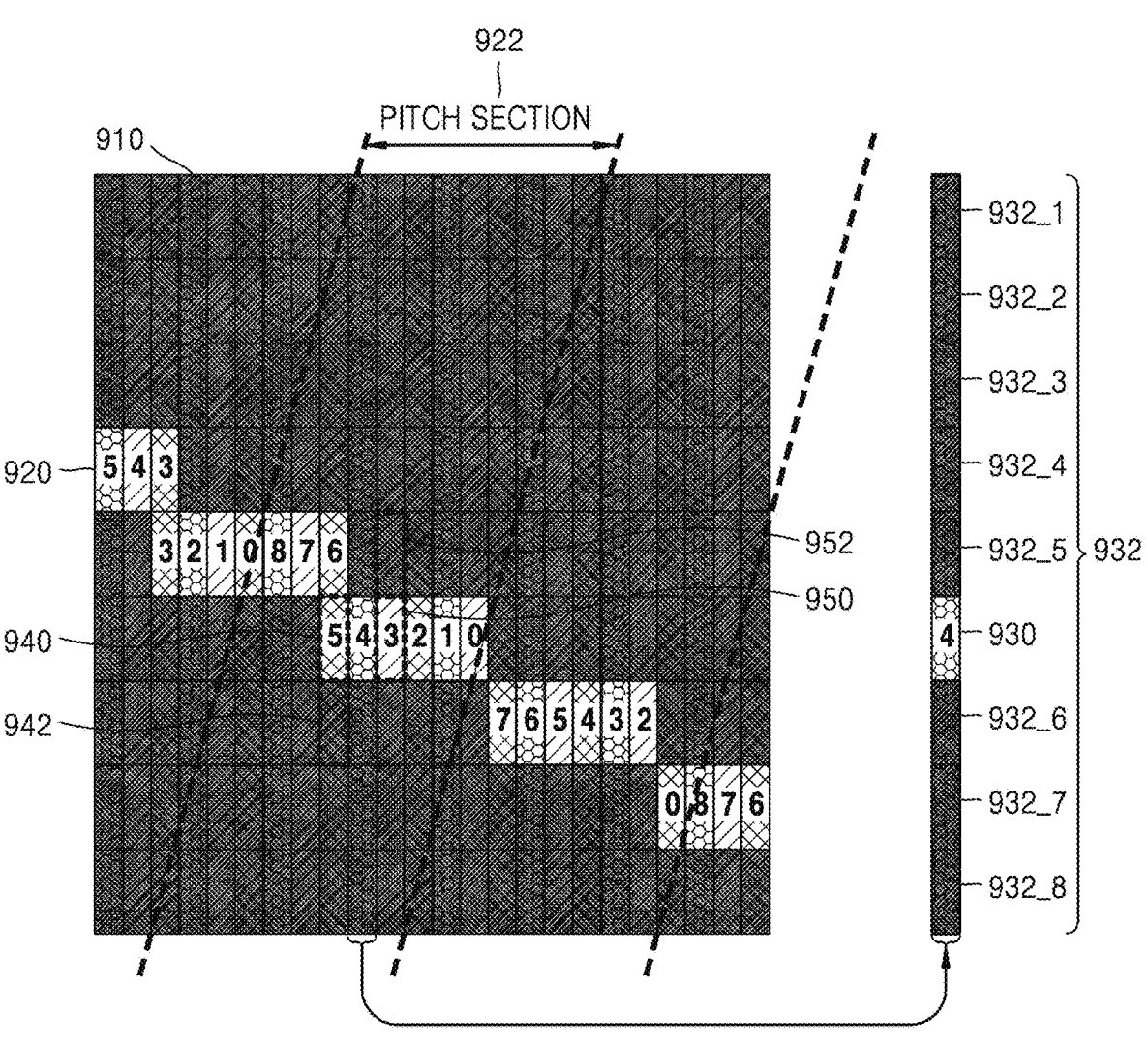
FIGS. 9A, 9B, and 9C are diagrams illustrating an example in which a display device corrects distortion of an area in which the distortion due to a lenticular lens occurs, according to one or more embodiments of the disclosure.
Figure 9B:
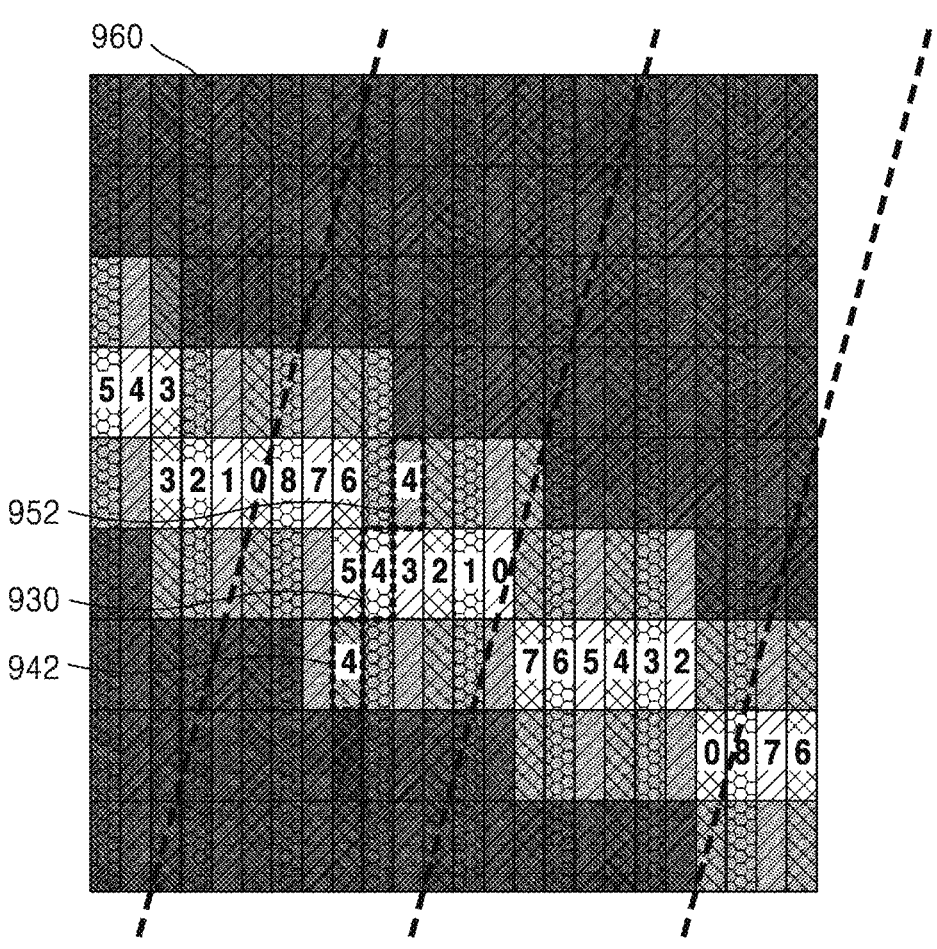
Figure 9C:
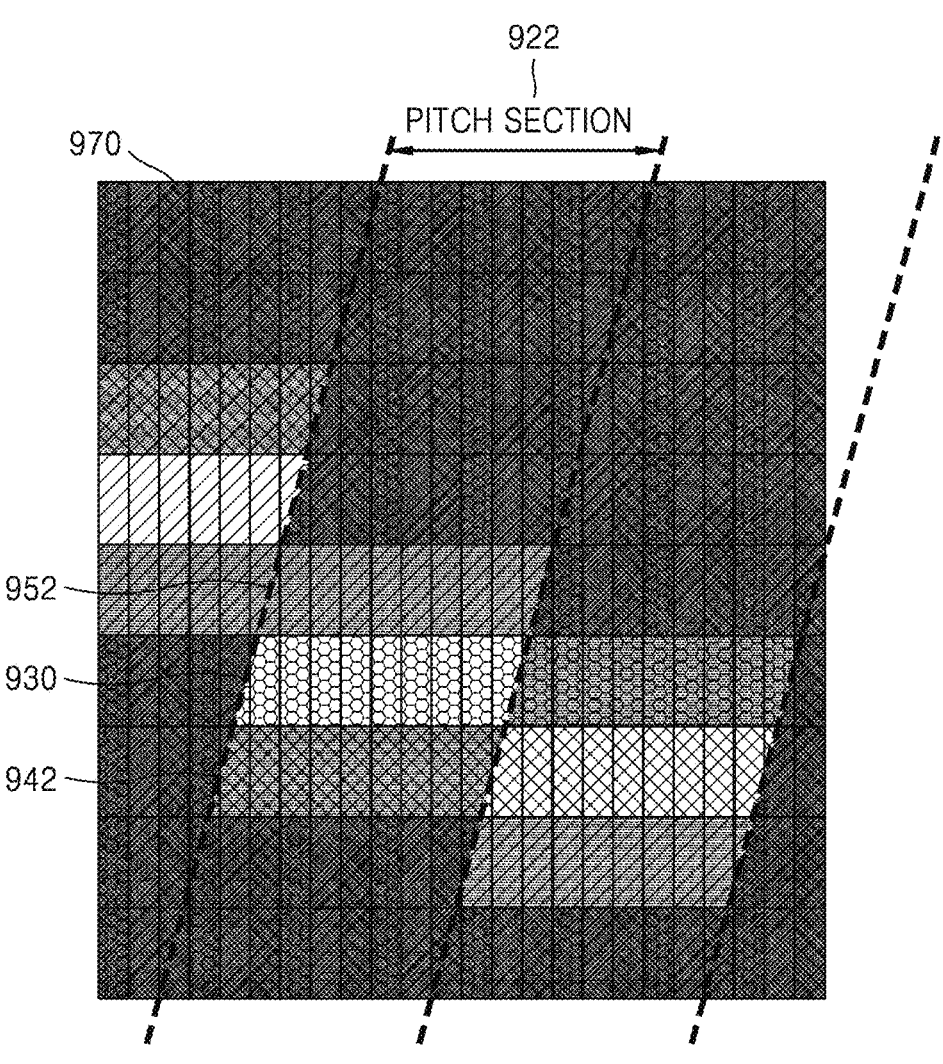

FIGS. 9A, 9B, and 9C are diagrams illustrating an example in which a display device corrects distortion of an area in which the distortion due to a lenticular lens occurs, according to one or more embodiments of the disclosure.

When describing FIGS. 9A to 9C, redundant descriptions with respect to at least one of FIGS. 1, 2A to 2E, 3, 4, 5A to 5D, 6A to 6C, 7, and 8 may be skipped.

FIG. 9A may show a target image 910 output on a display including a plurality of sub-pixel modules according to an embodiment of the disclosure.

Referring to FIGS. 9A, 9B and 9C, the display device may identify an area (hereinafter, the distortion area) 920 of at least one line having a thickness equal to or greater than a preset thickness, and may perform processing to correct distortion of the distortion area. Operations of the display device to be described below may be performed by the color separation distortion processing module 820 included in the display device.

According to an embodiment of the disclosure, the display device may select, for each sub-pixel included in the distortion area 920, a plurality of sub-pixels positioned in the same column as each sub-pixel, as sub-pixels to be combined. According to an embodiment of the disclosure, the display device may select, for each sub-pixel included in the distortion area 920, a plurality of sub-pixels included in the same pitch section as each sub-pixel, as sub-pixels to be combined. According to an embodiment of the disclosure, the display device may allocate a plurality of combination values to sub-pixels in the same column and/or the same pitch section as a particular sub-pixel, the plurality of combination values being obtained by combining various combinations of the sub-pixels included in the same column and/or the same pitch section as the particular sub-pixel included in the distortion area 920.

According to an embodiment of the disclosure, the display device may select a first sub-pixel set including a plurality of sub-pixels of the same column and/or the same pitch section 922 as a first sub-pixel 930 included in the distortion area 920. For example, the display device selects the first sub-pixel set including the plurality of sub-pixels of the same column as a first sub-pixel 524 in the pitch section 922 including the first sub-pixel 930. Referring to FIG. 9A, the display device may select the first sub-pixel set from among sub-pixels 930, 932_1, 932_2, . . . 932_7, 932_8, i.e., 932 of the same column as the first sub-pixel 524 in the pitch section 922.

According to an embodiment of the disclosure, the display device may select, as the first sub-pixel set, a plurality of sequentially arranged sub-pixels among the sub-pixels 932, but the disclosure is not limited thereto. For example, the display device selects, from among the sub-pixels 932, a second sub-pixel 932_5 immediately above the first sub-pixel 930 and a third sub-pixel 932_6 immediately below the first sub-pixel 930, as sub-pixels to be combined with respect to the first sub-pixel 930.

The display device may calculate, determine, generate, or obtain an output value for the first sub-pixel 930, based on values of a plurality of sub-pixels included in the first sub-pixel set. According to an embodiment of the disclosure, the display device may obtain a first combination value by combining values of the plurality of sub-pixels included in the first sub-pixel set. For example, the display device calculates (or determines, obtains), as a first combination value, a value of at least one of an average, a weighted sum, or a weighted average of the values of the plurality of sub-pixels included in the first sub-pixel set. The display device may allocate the calculated or obtained first combination value to an output value of the first sub-pixel 930.

According to an embodiment of the disclosure, the display device may select a second sub-pixel set including a plurality of sub-pixels from among the sub-pixels 932, for the second sub-pixel 932_5 included in the sub-pixels 932. The second sub-pixel set may include the second sub-pixel 932_5, but the disclosure is not limited thereto. The display device may select, from among the sub-pixels 932, a plurality of sequentially arranged sub-pixels as the second sub-pixel set, but the disclosure is not limited thereto. For example, the display device may select, from among the sub-pixels 932, the second sub-pixel 932_5 and two sub-pixels 932_4 and 932_3 above the second sub-pixel 932_5 as sub-pixels to be combined with respect to the second sub-pixel 932_5.

According to the examples described above, a scheme of selecting sub-pixels to be combined with respect to the second sub-pixel 932_5 may be different from a scheme of selecting sub-pixels to be combined with respect to the first sub-pixel 930, but the disclosure is not limited thereto. For example, as an example of the first sub-pixel 930, the display device selects the second sub-pixel 932_5, the first sub-pixel 930 immediately below the second sub-pixel, and a sub-pixel 932_4 immediately above the second sub-pixel, as sub-pixels to be combined with respect to the second sub-pixel 932_5.

The display device may calculate, determine, generate, or obtain an output value with respect to the second sub-pixel 932_5, based on values of the plurality of sub-pixels included in the second sub-pixel set. According to an embodiment of the disclosure, the display device may obtain a second combination value by combining the values of the plurality of sub-pixels included in the second sub-pixel set. For example, the display device calculates (or obtain), as the second combination value, a value of at least one of an average, a weighted sum, or a weighted average of the values of the plurality of sub-pixels included in the second sub-pixel set. The display device may allocate the calculated or obtained second combination value to an output value of the second sub-pixel 932_5.

The embodiment described with respect to the second sub-pixel 932_5 may be applied to other sub-pixel (e.g., a third sub-pixel 932_6) included in the sub-pixels 932. For example, for other sub-pixel, the display device may select a third sub-pixel set including a plurality of sub-pixels from among the sub-pixels 932, and may allocate a combination value to an output value of the other sub-pixel, the combination value being obtained by combining values of the plurality of sub-pixels included in the third sub-pixel set. The first sub-pixel set, the second sub-pixel set, and/or the third sub-pixel set may include sub-pixels that are different from each other, equal to each other, or partly equal to each other. The first combination value, the second combination value, and/or the third combination value may be different from each other or equal to each other.

Referring to FIG. 9A, the display device may determine an output value of other sub-pixels 940 and 950 by applying the embodiment described with respect to the first sub-pixel 930 to the other sub-pixels 940 and 950 included in the distortion area 920. An output value of sub-pixels 942 and 952 may be determined by applying the embodiments described with respect to the second sub-pixel 932_5 to the sub-pixels 942 and 952 included in the same column and the same pitch section 922 as the other sub-pixels 940 and 950.

FIG. 9B may show an image 960 that is output as the display device allocates a combination value to an output value, the combination value obtained with respect to sub-pixels according to an embodiment of the disclosure.

The sub-pixels 942 and 952 included in a black area and having a low output value (e.g., 0) in a target image before distortion correction 910 may be allocated, as an output value, a combination value for the sub-pixels 942 and 952 which is obtained via distortion correction processing. The first sub-pixel 930 included in a white area and having a high output value in the target image before distortion correction 910 may be allocated, as an output value, a combination value for the first sub-pixel 930 which is obtained via distortion correction processing. For example, via distortion correction processing, the output value of the first sub-pixel 930 may be decreased, compared to its original value, and the output value of the sub-pixels 942 and 952 may be increased, compared to its original value. In this case, compared to the target image before distortion correction 910, brightness of the white line may be decreased, and a width thereof may be increased, but the disclosure is not limited thereto.

Referring to a view image 970 of FIG. 9C, at a fourth view position, the first sub-pixel 930, the sub-pixel 942 and the sub-pixel 952 may be zoomed in at each row in the pitch section 922 and viewed. In the pitch section 626 of the view image 640 in FIG. 6C before distortion correction, only a Red sub-pixel constitutes a slim line, whereas in the pitch section 922 of the view image 970 of FIG. 9C after distortion correction, RGB sub-pixels may constitute a slim white line, and lights of the RGB sub-pixels may be mixed, and thus, may be recognized as a white line to a user. Therefore, the display device may provide the view image 970 in which a RGB color separation phenomenon is improved/alleviated. Compared to the view image 640 of FIG. 6C, a thickness of the slim white line in the view image 970 may become thicker and brightness may become lower.

FIG. 10 is a diagram illustrating an example in which a display device detects an area in which distortion due to a lenticular lens occurs, and corrects the distortion, according to an embodiment of the disclosure.

When describing FIG. 10, redundant descriptions with respect to at least one of FIGS. 1, 2A to 2E, 3, 4, 5A to 5D, 6A to 6C, 7, 8, and 9A to 9C may be skipped.

FIG. 10 may show an example in which the display device detects slanted angle-based edge distortion and color separation distortion from the target image 400 and corrects according to an embodiment of the disclosure.

The display device may perform processing of correcting the distortion due to the lenticular lens in the target image 400, thereby outputting an output image 1030. The output image 1030 may include an image in which values of at least some sub-pixels included in the target image 400 are changed.

The display device may identify a distortion area due to the lenticular lens in the target image 400. According to an embodiment of the disclosure, a distortion detection module 1010 of the display device may detect the distortion area due to the lenticular lens in the target image 400. Referring to FIG. 10, the distortion detection module 1010 may include a gray scale conversion module 1012, the slanted angle-based edge distortion detection module 420, and the color separation distortion detection module 810, but the disclosure is not limited thereto.

The gray scale conversion module 1012 may convert the input target image 400 into a gray scale, and thus, may generate (or, obtain) a gray scale image. The gray scale conversion module 1012 may provide the generated (or, obtained) gray scale image to each of the slanted angle-based edge distortion detection module 420 and the color separation distortion detection module 810.

According to an embodiment of the disclosure, the slanted angle-based edge distortion detection module 420 may detect, as an edge distortion area, at least one area including at least one edge having a slanted angle of which similarity to a slanted angle 440 is within a preset range in the input gray scale image, based on the slanted angle 440 of the lenticular lens. The slanted angle-based edge distortion detection module 420 may provide information about the detected edge distortion area to a distortion processing module 1020 (e.g., the edge distortion processing module 450). According to an embodiment of the disclosure, the color separation distortion detection module 810 may detect, from the input gray scale image, an area of at least one line having a thickness equal to or less than a preset thickness as a color separation distortion area. The color separation distortion detection module 810 may provide information about the detected color separation distortion area to the distortion processing module 1020 (e.g., the color separation distortion processing module 820).

The display device may perform distortion correction processing on the distortion area due to the lenticular lens which is detected from the target image 400. According to an embodiment of the disclosure, the distortion processing module 1020 of the display device may perform distortion correction, based on the information about the distortion area which is obtained from the distortion detection module 1010, and thus, may output the output image 1030. Referring to FIG. 10, the distortion processing module 1020 may include the edge distortion processing module 450 and the color separation distortion processing module 820, but the disclosure is not limited thereto.

According to an embodiment of the disclosure, the edge distortion processing module 450 may obtain a combination value by combining values of sub-pixels positioned in the same pitch section and the same row as each sub-pixel with respect to each sub-pixel included in the detected edge distortion are in the target image 400. The edge distortion processing module 450 may allocate the obtained combination value to an output value of each sub-pixel and/or sub-pixels of the same pitch section and the same row as each sub-pixel. According to an embodiment of the disclosure, the color separation distortion processing module 820 may obtain a combination value by combining values of sub-pixels positioned in the same pitch section and the same column as each sub-pixel with respect to each sub-pixel related to the color separation distortion area detected in the target image 400. The color separation distortion processing module 820 may allocate the obtained combination value to an output value of each sub-pixel and/or sub-pixels of the same pitch section and the same column as each sub-pixel.

The distortion processing module 1020 may output, as the output image 1030, an image in which an output value of at least some sub-pixels (e.g., sub-pixels of the distortion area) is changed in the target image 400 via distortion correction processing. For example, the distortion processing module 1020 may output the output image 1030 via an output device (e.g., a display) of the display device. Therefore, the display device may provide a user with a target image in which distortion is improved or corrected.

According to an embodiment of the disclosure, in order to prevent correction processing from being repeatedly performed in the distortion area of the target image 400, the color separation distortion detection module 810 may generate a mask image for detecting the color separation distortion area, based on a mask image (e.g., an angle-based mask image) generated by the slanted angle-based edge distortion detection module 420. For example, the color separation distortion detection module 810 may generate, based on the mask image of the slanted angle-based edge distortion detection module 420, the mask image via which an area of a line having a slanted angle of which similarity to the slanted angle 440 of the lenticular lens is within the present range from among lines having a thickness equal to or less than a preset thickness is not detected as the color separation distortion area.

In this case, the color separation distortion detection module 810 may detect, as the color separation distortion area, an area of a line having a thickness equal to or less than the preset thickness and having a slanted angle of which similarity to the slanted angle 440 of the lenticular lens exceeds the present range (e.g., not within the preset range)

in the target image 400. Therefore, the color separation distortion processing module 820 may perform distortion correction processing only on a line having a slanted angle of which similarity to the slanted angle 440 of the lenticular lens exceeds the preset range from among lines having a thickness equal to or less than a preset thickness, and the edge distortion processing module 450 may perform distortion correction processing on a line having a slanted angle of which similarity to the slanted angle 440 of the lenticular lens is within the preset range from among the lines having a thickness equal to or less than a preset thickness According to an embodiment of the disclosure, in order to prevent correction processing from being repeatedly performed in the distortion area of the target image 400, the slanted angle-based edge distortion detection module 420 may generate a mask image (e.g., an angle-based mask image) for detecting an edge distortion area, based on a mask image generated by the color separation distortion detection module 810. For example, the slanted angle-based edge distortion detection module 420 may generate, based on the mask image of the color separation distortion detection module 810, the mask image via which an area of a line having a thickness equal to or less than a preset thickness from among lines having a slanted angle of which similarity to the slanted angle 440 of the lenticular lens is within the preset range is not detected as the edge distortion area.

In this case, the slanted angle-based edge distortion detection module 420 may detect, as the edge distortion area, an area of a line having a thickness greater than the preset thickness and having a slanted angle of which similarity to the slanted angle 440 of the lenticular lens is within the preset range in the target image 400. Therefore, the edge distortion processing module 450 may perform distortion correction processing only on the line having a thickness greater than the preset thickness from among lines of which similarity to the slanted angle 440 of the lenticular lens is within the preset range, and the color separation distortion processing module 820 may perform distortion correction processing on a line having a thickness equal to or less than the preset thickness from among lines of which similarity to the slanted angle 440 of the lenticular lens is within the preset range.

An operation of the slanted angle-based edge distortion detection module 420 and an operation of the color separation distortion detection module 810 may be performed in parallel, may be simultaneously performed, or may be sequentially performed. For example, at least some operations of the color separation distortion detection module 810 may be performed after at least some operations of the slanted angle-based edge distortion detection module 420 are performed. An operation of the edge distortion processing module 450 and an operation of the color separation distortion processing module 820 may be performed in parallel, may be simultaneously performed, or may be sequentially performed.

Figure 11:
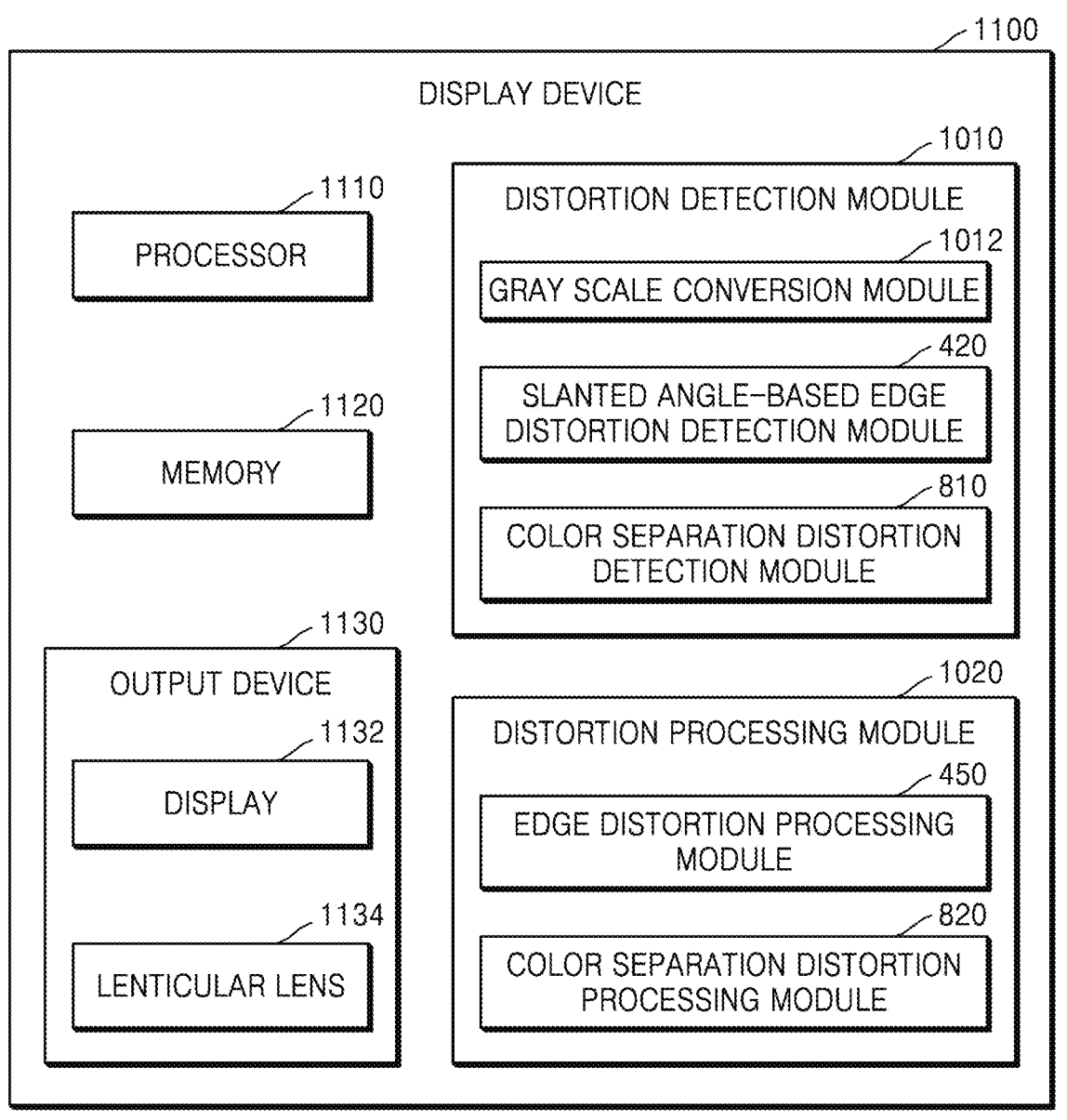
FIG. 11 is a diagram illustrating an example of a display device according to an embodiment of the disclosure.

FIG. 11 is a diagram illustrating an example of a display device according to an embodiment of the disclosure.

When describing FIG. 11, redundant descriptions with respect to at least one of FIGS. 1, 2A to 2E, 3, 4, 5A to 5D, 6A to 6C, 7, 8, 9A to 9C, and 10 may be skipped.

A display device 1100 shown in FIG. 11 is an electronic device including a lenticular lens 1134 and configured to output a target image (or, a video), and may include an outdoor monitor, a gaming monitor, a television, an electronic photo frame, a notebook, a desktop computer, a wearable device, or the like. According to an embodiment of the disclosure, the display device 1100 may be an electronic device configured to output a target image by correcting distortion due to the lenticular lens 1134 with respect to the target image. According to an embodiment of the disclosure, the display device 1100 may include at least one processor 1110, memory 1120, and an output device 1130, but the disclosure is not limited thereto.

The output device 1130 is an image output module and may include a display 1132. For example, the output device 1130 includes the lenticular lens 1134. The lenticular lens 1134 may be directly or indirectly attached, combined, or stacked to the display 1132. For example, another element included between the lenticular lens 1134 and the display 1132. The lenticular lens 1134 may be attached, combined, or stacked to the display 1132 while being slanted with a random slanted angle. Information about the slanted angle of the lenticular lens 1134 may be stored in the memory 1120.

The processor 1110 may be electrically connected to configurations included in the display device 1100, and thus, may execute computations or data processing related to control and/or communication of the configurations included in the display device 1100. According to an embodiment of the disclosure, the processor 1110 may load, to memory, and process a request, a command, or data which is received from at least one of other configurations, and may store processing result data in the memory. According to various embodiments of the disclosure, the processor 1110 may include at least one of a general-purpose processor such as a central processing unit (CPU), an application processor (AP), a digital signal processor (DSP), or the like, a graphics-dedicated processor such as a graphics processing unit (GPU), a vision processing unit (VPU) or the like, or an AI-dedicated processor such as a neural processing unit (NPU).

The processor 1110 may process input data or may control other configurations to process the input data, according to data, an operating rule, an algorithm, or a model which is stored in the memory 1120. The processor 1110 may perform, by using the input data, an operation of the operating rule, the algorithm, the method, or the model stored in the memory 1120.

The memory 1120 may be electrically connected to the processor 1110, and may store one or more modules, the algorithm, the operating rule, the model, a program, an instruction or data which is related to operations of the configurations included in the display device 1100. For example, the memory 1120 stores the one or more modules, the algorithm, the operating rule, the model, the program, the instruction or the data for processing and controlling by the processor 1110. The memory 1120 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc, but the disclosure is not limited thereto.

According to an embodiment of the disclosure, the memory 1120 may store data and/or information which is identified, obtained, generated, or determined by the display device 1100. For example, the memory 1120 stores, in a compressed form, the data and/or the information which is identified, obtained, generated, or determined by the display device 1100.

According to an embodiment of the disclosure, the display device 1100 may include a module configured to perform (or used to perform) at least one operation. Referring to FIG. 11, the display device 1100 may include the distortion detection module 1010 configured to perform an operation of identifying an area in which distortion occurs in a target image, and the distortion processing module 1020 configured to process a detected distortion area.

Some modules of the display device 1100 which are configured to perform at least one operation may be configured of a plurality of sub-modules or may constitute one module. For example, the distortion detection module 1010 includes, as sub-modules, the gray scale conversion module 1012, the slanted angle-based edge distortion detection module 420, and the color separation distortion detection module 810. For example, the distortion processing module 1020 includes, as sub-modules, the edge distortion processing module 450 and the color separation distortion processing module 820.

Inclusion relations between modules shown in FIG. 11 are merely an example of the display device 1100, and the disclosure is not limited thereto. For example, the display device 1100 includes a module for edge distortion, the module including the slanted angle-based edge distortion detection module 420 and the edge distortion processing module 450 as sub-modules, and a module for color separation distortion, the module including the color separation distortion detection module 810 and the color separation distortion processing module 820 as sub-modules.

Some of modules shown in FIG. 11 may be skipped. For example, the display device 1100 includes only the gray scale conversion module 1012, the slanted angle-based edge distortion detection module 420, and the edge distortion processing module 450. For example, the display device 1100 includes only the gray scale conversion module 1012, the module including the color separation distortion detection module 810, and the color separation distortion processing module 820.

Some modules configured to perform at least one operation of the display device 1100 may be implemented as a hardware module, a software module, and/or a combination thereof. The software module included in the display device 1100 may be included in the memory 1120. According to an embodiment of the disclosure, the module included in the memory 1120 may be executed by the processor 1110 so as to perform an operation. For example, the module (e.g., the software module) included in the memory 1120 is executed according to control or a command by the processor 1110, and may include a program, a model, or an algorithm configured to perform operations for deriving output data with respect to input data.

The display device 1100 may include more elements than elements shown in FIG. 11. According to an embodiment of the disclosure, the display device 1100 may further include a communication interface (or, a communication module) for communication with an external device. According to an embodiment of the disclosure, the display device 1100 may further include an input device and/or an input/output interface.

Figure 12:
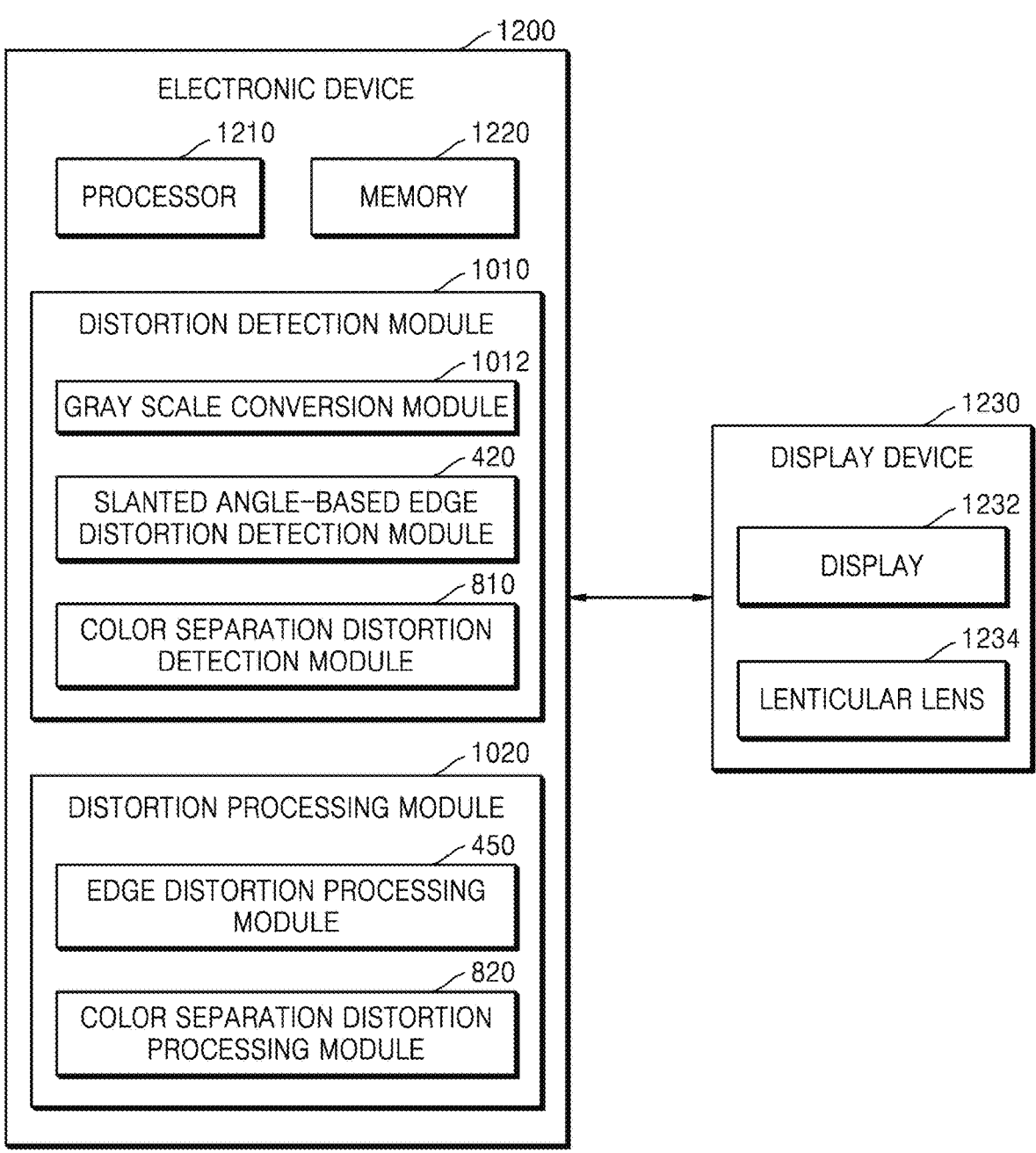
FIG. 12 is a diagram illustrating an example in which an electronic device corrects distortion due to a lenticular lens from a target image and provides the target image to a display device, according to an embodiment of the disclosure.

FIG. 12 is a diagram illustrating an example in which an electronic device corrects distortion due to a lenticular lens from a target image and provides the target image to a display device, according to an embodiment of the disclosure.

When describing FIG. 12, redundant descriptions with respect to at least one of FIGS. 1, 2A to 2E, 3, 4, 5A to 5D, 6A to 6C, 7, 8, 9A to 9C, 10, and 11 may be skipped.

An electronic device 1200 shown in FIG. 12 is an electronic device for providing a target image to a display device 1230 by correcting distortion for the target image due to a lenticular lens 1234 of the display device 1230, and may include a set-top box, a console device, a video player device, or the like. An embodiment of the display device described with reference to at least one of FIGS. 1, 2A to 2E, 3, 4, 5A to 5D, 6A to 6C, 7, 8, 9A to 9C, 10, and 11 above may be applied to the electronic device 1200. The electronic device 1200 may perform at least one operation described that the display device performs with reference to at least one of FIGS. 1, 2A to 2E, 3, 4, 5A to 5D, 6A to 6C, 7, 8, 9A to 9C, 10, and 11 above. For example, the electronic device 1200 performs an operation of detecting distortion and/or processing distortion with respect to a target image.

The display device 1230 shown in FIG. 12 may be a device that outputs a target image (i.e., a target image in which distortion due to the lenticular lens 1234 is corrected) provided from the electronic device 1200. As illustrated, the display device 1230 may include a display 1232 and the lenticular lens 1234, but the disclosure is not limited thereto. For example, the display device 1230 further includes a communication module (or a communication interface, a transceiver) configured to communicate with an external device, at least one processor, memory, or the like.

According to an embodiment of the disclosure, the electronic device 1200 may include at least one processor 1210 and memory 1220, but the disclosure is not limited thereto. The processor 1210 may be electrically connected to configurations included in the electronic device 1200, and thus, may execute computations or data processing related to control and/or communication of the configurations included in the electronic device 1200. According to an embodiment of the disclosure, the processor 1210 may load, to memory, and process a request, a command, or data which is received from at least one of other configurations, and may store processing result data in the memory. According to various embodiments of the disclosure, the processor 1210 may include at least one of a general-purpose processor such as a CPU, an AP, a DSP, or the like, a graphics-dedicated processor such as a GPU, a VPU or the like, or an AI-dedicated processor such as an NPU.

According to an embodiment of the disclosure, the processor 1210 may process input data or may control other configurations to process the input data, according to data, an operating rule, an algorithm, or a model which is stored in the memory 1220. According to an embodiment of the disclosure, the processor 1210 may perform, by using the input data, an operation of the operating rule, the algorithm, the method, or the model stored in the memory 1220.

The memory 1220 may be electrically connected to the processor 1210, and may store one or more modules, the algorithm, the operating rule, the model, a program, an instruction or data which is related to operations of the configurations included in the electronic device 1200. For example, the memory 1220 stores the one or more modules, the algorithm, the operating rule, the model, the program, the instruction or the data for processing and controlling by the processor 1210. The memory 1220 may include at least one type of storage medium from among flash memory, a hard disk, a multimedia card micro, a memory card (e.g., an SD or XD memory card), RAM, SRAM, ROM, EEPROM, PROM, magnetic memory, a magnetic disk, and an optical disc, but the disclosure is not limited thereto.

According to an embodiment of the disclosure, the memory 1220 may store data and/or information which is identified, obtained, generated, or determined by the electronic device 1200. For example, the memory 1220 stores, in a compressed form, the data and/or the information which is identified, obtained, generated, or determined by the electronic device 1200.

According to an embodiment of the disclosure, the electronic device 1200 may include a module configured to perform (or used to perform) at least one operation. As illustrated, the electronic device 1200 may include the distortion detection module 1010 configured to perform an operation of identifying an area of a target image in which distortion occurs, and the distortion processing module 1020 configured to process a detected distortion area.

Some modules of the electronic device 1200 which are configured to perform at least one operation may be configured of a plurality of sub-modules or may constitute one module. For example, the distortion detection module 1010 includes, as sub-modules, the gray scale conversion module 1012, the slanted angle-based edge distortion detection module 420, and the color separation distortion detection module 810. For example, the distortion processing module 1020 includes, as sub-modules, the edge distortion processing module 450 and the color separation distortion processing module 820.

Inclusion relations between modules shown in FIG. 12 are merely an example of the electronic device 1200, and the disclosure is not limited thereto. For example, the electronic device 1200 includes a module for edge distortion, the module including the slanted angle-based edge distortion detection module 420 and the edge distortion processing module 450 as sub-modules, and a module for color separation distortion, the module including the color separation distortion detection module 810 and the color separation distortion processing module 820 as sub-modules.

Some of modules shown in FIG. 12 may be skipped. For example, the electronic device 1200 includes only the gray scale conversion module 1012, the slanted angle-based edge distortion detection module 420, and the edge distortion processing module 450. For example, the electronic device 1200 includes only the gray scale conversion module 1012, the module including the color separation distortion detection module 810, and the color separation distortion processing module 820.

Some modules configured to perform at least one operation of the electronic device 1200 may be implemented as a hardware module, a software module, and/or a combination thereof. The software module included in the electronic device 1200 may be included in the memory 1220. According to an embodiment of the disclosure, a module included in the memory 1220 may be executed by the processor 1210, thereby performing an operation. For example, the module (i.e., the software module) included in the memory 1220 is executed according to a control or a command by the processor 1210, and includes a program, a model, or an algorithm which is configured to perform operations for deriving output data with respect to input data.

The electronic device 1200 may include more elements than elements shown in FIG. 12. For example, the electronic device 1200 further includes an input device and/or an input/output interface. For example, the electronic device 1200 further includes a communication module (or, a communication interface, a transceiver) for communication with an external device.

According to an embodiment of the disclosure, the electronic device 1200 may include a communication module for communication with the display device 1230. For example, the communication module of the electronic device 1200 supports establishment of a wired or wireless communication channel with other external electronic device (e.g., the display device 1230) or a server and communication via the established communication channel. According to an embodiment of the disclosure, the display device 1230 may include a communication module to communicate with the electronic device 1200. For example, the communication module of the display device 1230 supports establishment of a wired or wireless communication channel with other external electronic device (e.g., the electronic device 1200) or a server and communication via the established communication channel.

According to an embodiment of the disclosure, a communication module may receive a signal, information, a request and/or data from other external electronic device or a server via wired communication or wireless communication or may transmit a signal, information, a request, and/or data to the other external electronic device or the server. According to an embodiment, the communication module may include a wireless communication module (e.g.: a cellular communication module, a short-range communication module, or a global navigation satellite system (GNSS) communication module) or a wired communication module (e.g., a local area network (LAN) communication module or a power line communication module), and may communicate, by using at least one of the communication modules, with an external electronic device or server via at least one network, e.g., a short-range communication network (e.g., Bluetooth, wireless fidelity direct (Wi-Fi direct), or infrared data association (IrDA)) or a long-range communication network (e.g., a cellular network, the Internet, or a computer network (e.g., LAN or WAN)).

According to an embodiment of the disclosure, the electronic device 1200 and the display device 1230 may transmit or receive signals, data, requests, and/or information via a network and a communication module. For example, the electronic device 1200 and the display device 1230 directly transmits or receives signals, data, requests, and/or information, but the disclosure is not limited thereto. For example, the electronic device 1200 and the display device 1230 indirectly transmits or receives signals, data, requests, and/or information via other electronic device. According to an embodiment of the disclosure, the electronic device 1200 may transmit a target image in which distortion is corrected to the display device 1230 via a network and a communication module. According to an embodiment of the disclosure, the electronic device 1200 may transmit a signal for controlling the display device 1230 to output a target image in which distortion is corrected, via a network and a communication module.

Referring to FIG. 12, an example is shown, in which the electronic device 1200 performs distortion detection and distortion processing on a target image, and thus, provides an image in which distortion is corrected to the display device 1230, but the disclosure is not limited thereto. For example, the electronic device 1200 detects distortion of a target image, and the display device 1230 performs distortion correction processing, according to a result of the distortion detection by the electronic device 1200. For example, the electronic device 1200 detects edge distortion in a target image and may perform processing to correct the edge distortion, and the display device 1230 detects color separation distortion and may perform processing to correct the color separation distortion.

In the disclosure, redundant descriptions in FIGS. 1, 2A to 2E, 3, 4, 5A to 5D, 6A to 6C, 7, 8, 9A to 9C, 10, 11, and 12 may have been omitted, and one or more embodiments described with reference to at least one of FIGS. 1, 2A to 2E, 3, 4, 5A to 5D, 6A to 6C, 7, 8, 9A to 9C, 10, 11, and 12 may be combined to be implemented. In the disclosure, an operation described to be performed by a module may be executed/performed by a device including or storing the module, or may be executed/performed according to a control by at least one processor of the device including the module. In the disclosure, an operation described to be performed by a device may be executed/performed by a module included or stored in the device, or may be performed by using the module included or stored in the device, according to a control by at least one processor of the device.

According to an embodiment of the disclosure, a method performed by a display device including a lenticular lens may include obtaining, by the display device, a target image, identifying, by the display device, a predefined slanted angle of the lenticular lens, identifying, by the display device, in the target image, at least one area including at least one edge having a slanted angle of which similarity to the slanted angle of the lenticular lens is within a preset range, selecting, by the display device, a plurality of sub-pixels of a same row as a first sub-pixel included in the identified at least one area, allocating, by the display device, a first combination value to an output value of each of the plurality of sub-pixels, the first combination value being obtained by combining values of the plurality of sub-pixels. According to an embodiment of the disclosure, an image in which distortion due to the lenticular lens is improved or corrected may be provided to a viewer.

According to an embodiment of the disclosure, the method may include identifying a predefined pitch of the lenticular lens. According to an embodiment of the disclosure, the selecting of the plurality of sub-pixels of the same row as the first sub-pixel included in the identified at least one area may include selecting the plurality of sub-pixels of the same row as the first sub-pixel within a pitch section including the first sub-pixel from among a plurality of pitch sections of the lenticular lens. According to an embodiment of the disclosure, the plurality of pitch sections of the lenticular lens may be determined based on the slanted angle and the pitch of the lenticular lens. According to an embodiment of the disclosure, an image in which a disconnection phenomenon and a step phenomenon which may occur due to the lenticular lens are alleviated may be provided to a viewer.

According to an embodiment of the disclosure, the allocating of the first combination value to the output value of each of the plurality of sub-pixels, the first combination value being obtained by combining values of the plurality of sub-pixels, may include obtaining, as the first combination value, a value of at least one of an average, a weighted sum, or a weighted average of the values of the plurality of sub-pixels. According to an embodiment of the disclosure, as a combination value may be obtained via simple calculation, distortion due to the lenticular lens may be rapidly processed.

According to an embodiment of the disclosure, the identifying, in the target image, of the at least one area including the at least one edge having the slanted angle of which similarity to the slanted angle of the lenticular lens is within the preset range may include obtaining an edge image corresponding to the target image by detecting one or more edges from a gray scale image corresponding to the target image. According to an embodiment of the disclosure, the identifying, in the target image, of the at least one area including the at least one edge having the slanted angle of which similarity to the slanted angle of the lenticular lens is within the preset range may include generating a first mask image indicating at least one area including at least one edge having a slanted angle of which similarity to the slanted angle of the lenticular lens is within the preset range, from the edge image, based on the slanted angle of the lenticular lens. According to an embodiment of the disclosure, the identifying, in the target image, of the at least one area including the at least one edge having the slanted angle of which similarity to the slanted angle of the lenticular lens is within the preset range may include identifying, by applying the first mask image to the target image, at least one area including at least one edge having a slanted angle of which similarity to the slanted angle of the lenticular lens is within the preset range in the target image. According to an embodiment of the disclosure, distortion occurring at an edge slanted with a similar slope to a slanted angle of the lenticular lens may be corrected.

According to an embodiment of the disclosure, the method may include identifying an area of at least one line having a thickness equal to or less than a preset thickness in the target image. According to an embodiment of the disclosure, the method may include selecting a first sub-pixel set including a plurality of sub-pixels of a same column as a second sub-pixel included in the identified area of the at least one line. According to an embodiment of the disclosure, the method may include allocating a second combination value to an output value of the second sub-pixel, the second combination value being obtained by combining values of the plurality of sub-pixels included in the first sub-pixel set. According to an embodiment of the disclosure, the method may include selecting a second sub-pixel set including a plurality of sub-pixels of a same column as the second sub-pixel. According to an embodiment of the disclosure, the method may include allocating a third combination value to an output value of a third sub-pixel included in the second sub-pixel set, the third combination value being obtained by combining values of the plurality of sub-pixels included in the second sub-pixel set. According to an embodiment of the disclosure, a color separation phenomenon that occurs at a slim line due to the lenticular lens when a user views may be improved or corrected.

According to an embodiment of the disclosure, the selecting of the first sub-pixel set may include selecting the first sub-pixel set within a pitch section including the second sub-pixel from among the plurality of pitch sections of the lenticular lens. According to an embodiment of the disclosure, the selecting of the second sub-pixel set may include selecting the second sub-pixel set within the pitch section including the second sub-pixel.

According to an embodiment of the disclosure, the first sub-pixel set may be different from the second sub-pixel set. According to an embodiment of the disclosure, an image in which a color separation phenomenon is smoothly corrected by allocating different output values to a sub-pixel included in a slim white line and a sub-pixel adjacent to the sub-pixel.

According to an embodiment of the disclosure, the plurality of sub-pixels included in the first sub-pixel set may be sequentially arranged in a vertical direction with respect to the second sub-pixel in the target image. According to an embodiment of the disclosure, the plurality of sub-pixels included in the second sub-pixel set may be sequentially arranged in a vertical direction with respect to the third sub-pixel in the target image.

According to an embodiment of the disclosure, the identifying of the area of the at least one line having the thickness equal to or less than the preset thickness in the target image may include generating a second mask image indicating the area of the at least one line having the thickness equal to or less than the preset thickness from the gray scale image corresponding to the target image. According to an embodiment of the disclosure, the identifying of the area of the at least one line having the thickness equal to or less than the preset thickness in the target image may include identifying, by applying the second mask image to the target image, the area of the at least one line having the thickness equal to or less than the preset thickness in the target image.

According to an embodiment of the disclosure, the generating of the second mask image indicating the area of the at least one line having the thickness equal to or less than the preset thickness from the gray scale image corresponding to the target image may include obtaining a first image indicating a white area of the target image by enhancing brightness contrast and removing an area having a value less than a reference in the gray scale image. According to an embodiment of the disclosure, the generating of the second mask image indicating the area of the at least one line having the thickness equal to or less than the preset thickness from the gray scale image corresponding to the target image may include obtaining a second image in which the area of the at least one line having the thickness equal to or less than the preset thickness is removed from the white area of the target image, by performing a predefined morphological operation on the first image. According to an embodiment of the disclosure, the generating of the second mask image indicating the area of the at least one line having the thickness equal to or less than the preset thickness from the gray scale image corresponding to the target image may include generating the second mask image by performing calculation to subtract the second image from the first image. According to an embodiment of the disclosure, a color separation phenomenon that occurs at a slim white line due to the lenticular lens when a user views may be improved or corrected.

According to an embodiment of the disclosure, one or more non-transitory computer-readable storage media storing one or more computer programs including computer-executable instructions that, when executed by one or more processors of an display device individually or collectively, cause the display device to perform operations are provided. The operations include obtaining, by the display device, a target image, identifying, by the display device, a predefined slanted angle of the lenticular lens, identifying, by the display device, in the target image, at least one area including at least one edge having a slanted angle of which similarity to the slanted angle of the lenticular lens is within a preset range, selecting, by the display device, a plurality of sub-pixels of a same row as a first sub-pixel included in the identified at least one area, and allocating, by the display device, a first combination value to an output value of each of the plurality of sub-pixels, the first combination value being obtained by combining values of the plurality of sub-pixels.

According to an embodiment of the disclosure, a display device includes a lenticular lens, a display, memory storing one or more computer programs, and one or more processors communicatively coupled to the lenticular lens, the display and the memory, wherein the one or more computer programs include computer-executable instructions that, when executed by the one or more processors individually or collectively, cause the display device to obtain a target image, identify a predefined slanted angle of the lenticular lens, identify, in the target image, at least one area including at least one edge having a slanted angle of which similarity to the slanted angle of the lenticular lens is within a preset range, select a plurality of sub-pixels of a same row as a first sub-pixel included in the identified at least one area, allocate a first combination value to an output value of each of the plurality of sub-pixels, the first combination value being obtained by combining values of the plurality of sub-pixels.

According to an embodiment of the disclosure, the one or more computer programs further include computer-executable instructions that, when executed by the one or more processors individually or collectively, cause the display device to identify a predefined pitch of the lenticular lens, and select the plurality of sub-pixels of the same row as the first sub-pixel within a pitch section including the first sub-pixel from among a plurality of pitch sections of the lenticular lens. According to an embodiment of the disclosure, the plurality of pitch sections of the lenticular lens may be determined based on the slanted angle and the pitch of the lenticular lens.

According to an embodiment of the disclosure, the one or more computer programs further include computer-executable instructions that, when executed by the one or more processors individually or collectively, cause the display device to obtain, as the first combination value, a value of at least one of an average, a weighted sum, or a weighted average of the values of the plurality of sub-pixels.

According to an embodiment of the disclosure, the one or more computer programs further include computer-executable instructions that, when executed by the one or more processors individually or collectively, cause the display device to obtain an edge image corresponding to the target image by detecting one or more edges from a gray scale image corresponding to the target image, generate a first mask image indicating at least one area including at least one edge having a slanted angle of which similarity to the slanted angle of the lenticular lens is within the preset range, from the edge image, based on the slanted angle of the lenticular lens, and identify, by applying the first mask image to the target image, at least one area including at least one edge having a slanted angle of which similarity to the slanted angle of the lenticular lens is within the preset range in the target image.

According to an embodiment of the disclosure, the one or more computer programs further include computer-executable instructions that, when executed by the one or more processors individually or collectively, cause the display device to identify an area of at least one line having a thickness equal to or less than a preset thickness in the target image, select a first sub-pixel set including a plurality of sub-pixels of a same column as a second sub-pixel included in the identified area of the at least one line, allocate a second combination value to an output value of the second sub-pixel, the second combination value being obtained by combining values of the plurality of sub-pixels included in the first sub-pixel set, select a second sub-pixel set including a plurality of sub-pixels of a same column as the second sub-pixel, and allocate a third combination value to an output value of a third sub-pixel included in the second sub-pixel set, the third combination value being obtained by combining values of the plurality of sub-pixels included in the second sub-pixel set.

According to an embodiment of the disclosure, the one or more computer programs further include computer-executable instructions that, when executed by the one or more processors individually or collectively, cause the display device to select the first sub-pixel set within a pitch section including the second sub-pixel from among the plurality of pitch sections of the lenticular lens. According to an embodiment of the disclosure, the one or more computer programs further include computer-executable instructions that, when executed by the one or more processors individually or collectively, cause the display device to select the second sub-pixel set within the pitch section including the second sub-pixel.

According to an embodiment of the disclosure, the first sub-pixel set may be different from the second sub-pixel set.

According to an embodiment of the disclosure, the plurality of sub-pixels included in the first sub-pixel set may be sequentially arranged in a vertical direction with respect to the second sub-pixel in the target image. According to an embodiment of the disclosure, the plurality of sub-pixels included in the second sub-pixel set may be sequentially arranged in a vertical direction with respect to the third sub-pixel in the target image.

According to an embodiment of the disclosure, the one or more computer programs further include computer-executable instructions that, when executed by the one or more processors individually or collectively, cause the display device to generate a second mask image indicating the area of the at least one line having the thickness equal to or less than the preset thickness from the gray scale image corresponding to the target image, and identify, by applying the second mask image to the target image, the area of the at least one line having the thickness equal to or less than the preset thickness in the target image.

A machine-readable storage medium may be provided in the form of a non-transitory storage medium. Here, the term 'non-transitory storage medium' may mean that the storage medium is a tangible device and does not include signals (e.g., electromagnetic waves), and may mean that data may be permanently or temporarily stored in the storage medium. For example, the 'non-transitory storage medium' includes a buffer in which data is temporarily stored.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user apparatuses (e.g., smartphones). In a case of online distribution, at least a portion of the computer program product (e.g., a downloadable application) may be at least temporarily stored or temporarily generated in a machine-readable storage medium such as a manufacturer's server, a server of an application store, or memory of a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a display device comprising a lenticular lens, the method comprising:

obtaining, by the display device, a target image;

identifying, by the display device, a predefined first slanted angle at which the lenticular lens is slanted with respect to a display axis;

identifying, by the display device, at least one area in the target image, which comprises at least one edge within the target image, which is slanted with respect to the display axis at a second slanted angle that is within a preset range from the first slanted angle;

selecting, by the display device, a plurality of sub-pixels of a same row as a first sub-pixel comprised in the identified at least one area; and allocating, by the display device, a first combination value to an output value of each of the plurality of sub-pixels, the first combination value being obtained by combining values of the plurality of sub-pixels.

2. The method of claim 1, further comprising:

identifying a predefined pitch of the lenticular lens, wherein the selecting of the plurality of sub-pixels of the same row as the first sub-pixel comprised in the identified at least one area comprises:

selecting the plurality of sub-pixels of the same row as the first sub-pixel within a pitch section comprising the first sub-pixel from among a plurality of pitch sections of the lenticular lens, and wherein the plurality of pitch sections of the lenticular lens are determined based on the first slanted angle and the predefined pitch of the lenticular lens.

3. The method of claim 1, wherein the allocating of the first combination value to the output value of each of the plurality of sub-pixels, the first combination value being obtained by combining values of the plurality of sub-pixels, comprises obtaining, as the first combination value, a value of at least one of an average, a weighted sum, or a weighted average of the values of the plurality of sub-pixels.

4. The method of claim 1, wherein the identifying of the at least one area in the target image, which comprises the at least one edge within the target image, which is slanted with respect to the display axis at the second slanted angle that is within the preset range from the first slanted angle, comprises:

obtaining an edge image corresponding to the target image by detecting one or more edges from a gray scale image corresponding to the target image;

generating a first mask image indicating the at least one area which comprises the at least one edge which is slanted with respect to the display axis at the second slanted angle, from the edge image, based on the first slanted angle; and identifying, by applying the first mask image to the target image, the at least one area in the target image, which comprises the at least one edge within the target image, which is slanted with respect to the display axis at the second slanted angle.

5. The method of claim 1, further comprising:

identifying an area of at least one line having a thickness equal to or less than a preset thickness in the target image;

selecting a first sub-pixel set comprising a plurality of sub-pixels of a same column as a second sub-pixel comprised in the identified area of the at least one line;

allocating a second combination value to an output value of the second sub-pixel, the second combination value being obtained by combining values of the plurality of sub-pixels comprised in the first sub-pixel set;

selecting a second sub-pixel set comprising a plurality of sub-pixels of a same column as the second sub-pixel; and allocating a third combination value to an output value of a third sub-pixel comprised in the second sub-pixel set, the third combination value being obtained by combining values of the plurality of sub-pixels comprised in the second sub-pixel set.

6. The method of claim 5, wherein the selecting of the first sub-pixel set comprises selecting the first sub-pixel set within a pitch section comprising the second sub-pixel from among a plurality of pitch sections of the lenticular lens, and wherein the selecting of the second sub-pixel set comprises selecting the second sub-pixel set within the pitch section comprising the second sub-pixel.

7. The method of claim 5, wherein the first sub-pixel set is different from the second sub-pixel set.

8. The method of claim 5, wherein the plurality of sub-pixels comprised in the first sub-pixel set are sequentially arranged in a vertical direction with respect to the second sub-pixel in the target image, and wherein the plurality of sub-pixels comprised in the second sub-pixel set are sequentially arranged in a vertical direction with respect to the third sub-pixel in the target image.

9. The method of claim 5, wherein the identifying of the area of the at least one line having the thickness equal to or less than the preset thickness in the target image comprises:

generating a second mask image indicating the area of the at least one line having the thickness equal to or less than the preset thickness from a gray scale image corresponding to the target image; and identifying, by applying the second mask image to the target image, the area of the at least one line having the thickness equal to or less than the preset thickness in the target image.

10. The method of claim 9, wherein the generating of the second mask image indicating the area of the at least one line having the thickness equal to or less than the preset thickness from the gray scale image corresponding to the target image comprises:

obtaining a first image indicating a white area of the target image by enhancing brightness contrast and removing an area having a value less than a reference in the gray scale image;

obtaining a second image in which the area of the at least one line having the thickness equal to or less than the preset thickness is removed from the white area of the target image, by performing a predefined morphological operation on the first image; and generating the second mask image by performing calculation to subtract the second image from the first image.

11. The method of claim 9, wherein the at least one line having the thickness equal to or less than the preset thickness includes a line whose width value is equal to or less than a preset value.

12. The method of claim 9, wherein the at least one line having thickness equal to or less than the preset thickness further includes a line in which a number of pixels included in a width of the line is equal to or less than a preset number, or a line in which a pixel-unit width value is equal to or less than a preset pixel-unit width value.

13. The method of claim 9, wherein the preset thickness is determined to be an absolute value or a relative value.

14. One or more non-transitory computer-readable storage media storing one or more computer programs including computer-executable instructions that, when executed by one or more processors of a display device individually or collectively, cause the display device to perform operations, the operations comprising:

obtaining, by the display device, a target image;

identifying, by the display device, a predefined first slanted angle at which a lenticular lens of the display device is slanted with respect to a display axis;

identifying, by the display device, at least one area in the target image, which comprises at least one edge within the target image, which is slanted with respect to the display axis at a second slanted angle that is within a preset range from the first slanted angle;

selecting, by the display device, a plurality of sub-pixels of a same row as a first sub-pixel comprised in the identified at least one area; and allocating, by the display device, a first combination value to an output value of each of the plurality of sub-pixels, the first combination value being obtained by combining values of the plurality of sub-pixels.

15. A display device comprising:

a lenticular lens;

a display;

memory storing one or more computer programs; and one or more processors communicatively coupled to the display and the memory, wherein the one or more computer programs include computer-executable instructions that, when executed by the one or more processors individually or collectively, cause the display device to:

obtain a target image, identify a predefined first slanted angle at which the lenticular lens is slanted with respect to a display axis, identify at least one area in the target image, which comprises at least one edge within the target image, which is slanted with respect to the display axis at a second slanted angle that is within a preset range from the first slanted angle, select a plurality of sub-pixels of a same row as a first sub-pixel comprised in the identified at least one area, and allocate a first combination value to an output value of each of the plurality of sub-pixels, the first combination value being obtained by combining values of the plurality of sub-pixels.

16. The display device of claim 15, wherein the one or more computer programs further include computer-executable instructions that, when executed by the one or more processors individually or collectively, cause the display device to:

identify a predefined pitch of the lenticular lens, and select the plurality of sub-pixels of the same row as the first sub-pixel within a pitch section comprising the first sub-pixel from among a plurality of pitch sections of the lenticular lens, and wherein the plurality of pitch sections of the lenticular lens are determined based on the first slanted angle and the predefined pitch of the lenticular lens.

17. The display device of claim 16, wherein the one or more computer programs further include computer-executable instructions that, when executed by the one or more processors individually or collectively, cause the display device to:

obtain, as the first combination value, a value of at least one of an average, a weighted sum, or a weighted average of the values of the plurality of sub-pixels.

18. The display device of claim 17, wherein the one or more computer programs further include computer-executable instructions that, when executed by the one or more processors individually or collectively, cause the display device to:

obtain an edge image corresponding to the target image by detecting one or more edges from a gray scale image corresponding to the target image, generate a first mask image indicating the at least one area which comprises the at least one edge which is slanted with respect to the display axis at the second slanted angle, from the edge image, based on the first slanted angle, and identify, by applying the first mask image to the target image, the at least one area in the target image, which comprises the at least one edge within the target image, which is slanted with respect to the display axis at the second slanted angle.

19. The display device of claim 18, wherein the one or more computer programs further include computer-executable instructions that, when executed by the one or more processors individually or collectively, cause the display device to:

identify an area of at least one line having a thickness equal to or less than a preset thickness in the target image, select a first sub-pixel set comprising a plurality of sub-pixels of a same column as a second sub-pixel comprised in the identified area of the at least one line, allocate a second combination value to an output value of the second sub-pixel, the second combination value being obtained by combining values of the plurality of sub-pixels comprised in the first sub-pixel set, select a second sub-pixel set comprising a plurality of sub-pixels of a same column as the second sub-pixel, and allocate a third combination value to an output value of a third sub-pixel comprised in the second sub-pixel set, the third combination value being obtained by combining values of the plurality of sub-pixels comprised in the second sub-pixel set.

20. The display device of claim 19, wherein the one or more computer programs further include computer-executable instructions that, when executed by the one or more processors individually or collectively, cause the display device to:

select the first sub-pixel set within a pitch section comprising the second sub-pixel from among the plurality of pitch sections of the lenticular lens, and select the second sub-pixel set within the pitch section comprising the second sub-pixel.

* * * * *